US010323136B2

(12) United States Patent
Pfaendner et al.

(10) Patent No.: US 10,323,136 B2
(45) Date of Patent: Jun. 18, 2019

(54) USE OF HYDROXYBENZOTRIAZOLE DERIVATIVES AND/OR HYDROXY INDAZOLE DERIVATIVES AS FLAME RETARDANTS FOR PLASTICS AND FLAMEPROOF PLASTIC MOULDED BODIES

(71) Applicant: FRAUNHOFER-GESELLSCHAFT ZUR FÖRDERUNG DER ANGEWANDTEN FORSCHUNG E.V., München (DE)

(72) Inventors: Rudolf Pfaendner, Rimbach (DE); Markus Mazurowski, Ginsheim-Gustavsburg (DE)

(73) Assignee: Fraunhofer-Gesellschaft zur förderung der angewandten Forschung e.V., München (DE)

( * ) Notice: Subject to any disclaimer, the term of this patent is extended or adjusted under 35 U.S.C. 154(b) by 76 days.

(21) Appl. No.: 15/317,899

(22) PCT Filed: May 28, 2015

(86) PCT No.: PCT/EP2015/061771
§ 371 (c)(1),
(2) Date: Dec. 9, 2016

(87) PCT Pub. No.: WO2015/189034
PCT Pub. Date: Dec. 17, 2015

(65) Prior Publication Data
US 2017/0121499 A1 May 4, 2017

(30) Foreign Application Priority Data
Jun. 12, 2014 (DE) .................. 10 2014 211 276

(51) Int. Cl.
| C08K 5/3475 | (2006.01) |
| C08K 5/5357 | (2006.01) |
| C08K 5/5313 | (2006.01) |
| C08K 5/00 | (2006.01) |
| C08K 5/3447 | (2006.01) |

(52) U.S. Cl.
CPC .......... *C08K 5/3475* (2013.01); *C08K 5/0066* (2013.01); *C08K 5/3447* (2013.01); *C08K 5/5313* (2013.01); *C08K 5/5357* (2013.01)

(58) Field of Classification Search
CPC .. C08K 5/3475; C08K 5/5357; C08K 5/5313; C08K 5/0066; C08K 5/3447
See application file for complete search history.

(56) References Cited

U.S. PATENT DOCUMENTS

| 2,682,522 A | 6/1954 | Coover et al. |
| 2,716,101 A | 8/1955 | Coover et al. |
| 2,891,915 A | 6/1959 | McCormack et al. |
| 3,326,852 A | 6/1967 | Thomas |
| 3,442,854 A | 5/1969 | Curtius et al. |
| 3,488,329 A | 1/1970 | Johnson |
| 3,578,641 A | 5/1971 | Johnson |
| 3,895,170 A * | 7/1975 | Tanaka .................. C23F 11/149 106/14.13 |
| 3,915,930 A | 10/1975 | Dotson, Jr. et al. |
| 3,919,363 A | 11/1975 | Ura et al. |
| 3,946,093 A | 3/1976 | Koto et al. |
| 4,218,332 A | 8/1980 | Schwab et al. |
| 4,328,174 A | 5/1982 | Schmidt et al. |
| 4,331,614 A | 5/1982 | Schmidt et al. |
| 4,374,971 A | 2/1983 | Schmidt et al. |
| 4,415,719 A | 11/1983 | Schmidt et al. |
| 5,216,113 A | 6/1993 | Schulz-Schlitte et al. |
| 5,334,692 A | 8/1994 | Hess et al. |
| 6,288,210 B1 | 9/2001 | Shobha et al. |
| 6,291,630 B1 | 9/2001 | König et al. |
| 6,861,499 B2 | 3/2005 | Vinciguerra et al. |
| 7,115,765 B2 | 10/2006 | Sprenger et al. |
| 7,390,970 B2 | 6/2008 | Lee et al. |
| 7,745,519 B2 | 6/2010 | Ihara et al. |
| 7,816,486 B2 | 10/2010 | Freitag et al. |
| 7,872,198 B2 | 1/2011 | Lee et al. |
| 8,058,329 B2 | 11/2011 | Just et al. |

(Continued)

FOREIGN PATENT DOCUMENTS

| CA | 819181 A | 7/1969 |
| CN | 1606592 A | 4/2005 |

(Continued)

OTHER PUBLICATIONS

State Intellectual Property Office of People's Republic of China, Notification of First Office Action issued in Chinese Patent Application No. 201580031450.X (dated Mar. 9, 2018).
Aubert et al., "Azoalkanes—novel flame retardants and their structure—property relationship," *Polym. Adv. Technol.* 22(11): 1529-1538 (2011).
Carpino et al.. "The uronium/guanidinium peptide coupling reagents: Finally the true uronium salts," *Angewandte Chemie-International Edition* 41: 442-445 (2002).
Dintcheva et al., "Photo-oxidation behaviour of polyethylene/multi-wall carbon nanotube composite films," *Polymer Degradation and Stability*, vol. 94, No. 2, pp. 162-170 (2008).

(Continued)

*Primary Examiner* — Peter F Godenschwager
*Assistant Examiner* — Andrew J. Oyer
(74) *Attorney, Agent, or Firm* — Leydig, Voit & Mayer, Ltd.

(57) ABSTRACT

The present invention relates to the use of N-hydroxybenzotriazole derivatives, in particular N-hydroxybenzotriazole salts and/or N-hydroxyindazoles, in particular N-hydroxyindazole salts as flame retardant for plastic materials. The present invention relates in addition to a flame-retardant plastic material molding compound which comprises N-hydroxybenzotriazole derivatives and/or N-hydroxyindazole derivatives as flame retardant.

8 Claims, No Drawings

(56) References Cited

U.S. PATENT DOCUMENTS

| | | |
|---|---|---|
| 8,288,456 B2 | 10/2012 | Feldermann et al. |
| 8,349,925 B2 | 1/2013 | Butz |
| 8,853,307 B2 | 10/2014 | Butz |
| 2005/0020800 A1 | 1/2005 | Levchik et al. |
| 2005/0064177 A1 | 3/2005 | Lee et al. |
| 2005/0176983 A1 | 8/2005 | Sprenger et al. |
| 2007/0135538 A1 | 6/2007 | Ihara et al. |
| 2007/0219295 A1 | 9/2007 | Levchik et al. |
| 2008/0045673 A1 | 2/2008 | Piotrowski et al. |
| 2008/0167405 A1 | 7/2008 | Just et al. |
| 2008/0226918 A1 | 9/2008 | Lee et al. |
| 2009/0118394 A1 | 5/2009 | Feldermann et al. |
| 2009/0286060 A1 | 11/2009 | Sala et al. |
| 2010/0230158 A1 | 9/2010 | Hase et al. |
| 2010/0280215 A1 | 11/2010 | Just et al. |
| 2011/0027512 A1 | 2/2011 | Lee et al. |
| 2011/0256457 A1 | 10/2011 | Utsumi |
| 2011/0257310 A1 | 10/2011 | Butz |
| 2013/0203928 A1 | 8/2013 | Hocke et al. |
| 2014/0005289 A1 | 1/2014 | Butz |
| 2016/0052927 A1 | 2/2016 | Pfaendner et al. |
| 2016/0272789 A1 | 9/2016 | Pfaendner et al. |

FOREIGN PATENT DOCUMENTS

| | | | |
|---|---|---|---|
| CN | 101068869 A | 11/2007 | |
| CN | 102031101 A | 4/2011 | |
| CN | 102115530 A | 7/2011 | |
| CN | 102115558 A | 7/2011 | |
| CN | 102250400 A | 11/2011 | |
| CN | 102342869 A | 2/2012 | |
| CN | 102344598 A | 2/2012 | |
| CN | 102382453 A | 3/2012 | |
| CN | 102585429 A | 7/2012 | |
| DE | 268 249 A1 | 5/1989 | |
| DE | 100 22 946 A1 | 11/2001 | |
| DE | 600 07 914 T2 | 12/2004 | |
| DE | 102004010455 A1 | 9/2005 | |
| DE | 102007040927 A1 | 3/2009 | |
| DE | 112008003070 T5 | 9/2010 | |
| DE | 102009047030 A1 | 2/2011 | |
| DE | 102013005307 A1 | 9/2014 | |
| EP | 0 303 988 A2 | 2/1989 | |
| EP | 0 767 182 A2 | 4/1997 | |
| EP | 0 935 619 B1 | 6/2001 | |
| EP | 2 426 163 A1 | 3/2012 | |
| EP | 2 450 401 A1 | 5/2012 | |
| GB | 918440 | 2/1963 | |
| GB | 918440 A * | 2/1963 | ............... C08K 3/16 |
| JP | H10-213912 A | 8/1998 | |
| JP | 2007-016162 A | 1/2007 | |
| JP | 2007-016163 A | 1/2007 | |
| WO | WO 1999/000450 A1 | 1/1999 | |
| WO | WO 2002/074847 A1 | 9/2002 | |
| WO | WO 2003/016388 A1 | 2/2003 | |
| WO | WO 2003/070736 A1 | 8/2003 | |
| WO | WO 2006/084488 A1 | 8/2006 | |
| WO | WO 2006/084489 A1 | 8/2006 | |
| WO | WO 2008/101845 A1 | 8/2008 | |
| WO | WO 2009/080554 A1 | 7/2009 | |
| WO | WO 2010/026230 A1 | 3/2010 | |
| WO | WO 2010/135398 A1 | 11/2010 | |
| WO | WO 2011/000019 A1 | 1/2011 | |
| WO | WO 2011/003773 A1 | 1/2011 | |
| WO | WO 2011/086114 A1 | 7/2011 | |
| WO | WO 2011/117266 A1 | 9/2011 | |
| WO | WO 2011/156077 A1 | 12/2011 | |
| WO | WO 2012/052376 A1 | 4/2012 | |
| WO | WO 2012/089998 A2 | 7/2012 | |
| WO | WO 2013/020696 A2 | 2/2013 | |
| WO | WO 2013/068437 A2 | 5/2013 | |
| WO | WO 2013/072295 A1 | 5/2013 | |
| WO | WO 2014/076273 A1 | 5/2014 | |
| WO | WO 2014/154636 A1 | 10/2014 | |
| WO | WO 2015/180888 A1 | 12/2015 | |
| WO | WO 2015/189034 A1 | 12/2015 | |

OTHER PUBLICATIONS

Imajo et al., "Polyimides derived from bis-N-hydroxyimides. II. Synthesis and properties of polyimide-esters," *Journal of Polymer Science Part A: Polymer Chemistry*, vol. 18(7), pp. 2189-2196 (1980).

Imajo et al., "Polymides derived from bis-N-hydroxyimides. III. Polymide-carbonates and polymide-urethanes synthesized from bischloroformate of N,N'dihydroxypyromellitic diimide," *Journal of Polymer Science Part A: Polymer Chemistry*, vol. 19(7), pp. 1855-1861 (1981).

Katsenis et al., "Initial use of 1-hydroxybenzotriazole in the chemistry of group 12 metals: An 1D zinc(II) coordination polymer and a mononuclear cadmium(II) complex containing the deprotonated ligand in a novel monodentate ligation mode," *Inorg. Chem. Comm.* 12(2): 92-96 (2009).

Pawelec et al., "Triazene compounds as a novel and effective class of flame retardants for polypropylene," *Polym. Degrad. Stab.* 87(6): 48-954 (2012).

Pfaendner, "Nitroxyl radicals and nitroxylethers beyond stabilization: radical generators for efficient polymer modification," *Comptes Rendus Chimie* 9(11):1338-1344 (2006).

*Plastics Additives Handbook*, 5th edition, Chapter I—"Antioxidants," H. Zweifel, edition, Munich, pp. 1-139 (2001).

Shi et al., "Influence of wall number and surface functionalization of carbon nanotubes on their antioxidant behavior in high density polyethylene," *Carbon*, 50(3):1005-1013 (2012).

Spatz et al. "Some N-Substituted Tetrabromophthalimide Fire-Retardant Additives", *Industrial & Engineering Chemistry Product Research and Development*, vol. 8, pp. 397-398 (1969).

Spitalsky et al., "Carbon nanotube-polymer composites: Chemistry, processing, mechanical and electrical properties," *Progr. Pol. Sci.* 35:357-401 (2010).

Watts et al., "Carbon nanotubes as polymer antioxidants," *J. Mater. Chem.*, 3(13): 491-495 (2003).

Wilén et al., "Improving weathering resistance of flame-retarded polymers," *Journal of Applied Polymer Science* 129(3):925-944 (2013).

Zeynalov et al., "Antioxidative Activity of Carbon Nanotube and Nanofiber," *The Open Materials Science Journal*, vol. 2, pp. 28-34 (2008).

European Patent Office, International Search Report in International Application No. PCT/EP2015/061771 (dated Aug. 4, 2015).

European Patent Office, Written Opinion in International Application No. PCT/EP2015/061771 (dated Aug. 4, 2015).

International Bureau of WIPO, International Preliminary Report on Patentability in International Application No. PCT/EP2015/061771 (dated Dec. 15, 2016).

Aubert et al., "Azoalkanes: A Novel Class of Additives for Cross-Linking and Controlled Degradation of Polyolefins," *Macromol. Mater. Eng.* 292(16): 707-714 (2007).

Bacsa et al., "Solid-Phase Synthesis of Difficult Peptide Sequences at Elevated Temperatures: A Critical Comparison of Microwave and Conventional Heating Technologies," *J. Org. Chem.* 73(19): 7532-7542 (2008).

Japan Patent Office, Notification of Reasons for Refusal issued in Japanese Application No. 2016-572474 (dated Nov. 29, 2017) 5 pp.

Korean Intellectual Property Office, Notification of Reason for Refusal in Korean Patent Application No. 10-2017-7000877 (dated Nov. 20, 2018).

\* cited by examiner

USE OF HYDROXYBENZOTRIAZOLE DERIVATIVES AND/OR HYDROXY INDAZOLE DERIVATIVES AS FLAME RETARDANTS FOR PLASTICS AND FLAMEPROOF PLASTIC MOULDED BODIES

CROSS-REFERENCE TO RELATED APPLICATIONS

This patent application is the U.S. national phase of International Application No. PCT/EP2015/061771, filed on May 28, 2015, which claims the benefit of German Patent Application No. 10 2014 211 276.1, filed Jun. 12, 2014, the disclosures of which are incorporated herein by reference in their entireties for all purposes.

The present invention relates to the use of N-hydroxybenzotriazole derivatives, in particular N-hydroxybenzotriazole salts and/or N-hydroxyindazoles, in particular N-hydroxyindazole salts as flame retardant for plastic materials. The present invention relates in addition to a flame-retardant plastic material moulding compound which comprises N-hydroxybenzotriazole derivatives and/or N-hydroxyindazole derivatives as flame retardant.

Most plastic materials, such as e.g. plastic materials based on polyolefins, polystyrene, polyamides, polyurethanes or polyesters, are flammable and comparatively easily combustible. In order to prevent or preclude the fire risk in plastic materials in specific applications, it is therefore absolutely necessary to reduce the flammability and to use flameproof or flame-retardant plastic material compositions. In general, flame retardants are added to the plastic material for this purpose with the aim of preventing ignition for a specific time or of significantly delaying the spread of fire. Traditional flame retardants are based on chlorine- and bromine-containing compounds (mostly in combination with antimony trioxide), on phosphorus-containing, on nitrogen-containing compounds and/or on inorganic hydroxides. In recent times, halogen-free flame-retardant solutions have become preferred for environmental reasons and/or from the point of view of toxicology.

For the production of flame-retardant plastic materials, there is a large number of flame retardants which are used generally substrate-specifically for a specific polymer and for a specific area of use corresponding to the national and international standards which form the basis thereof. Flame-retardant plastic materials are used for example in electrical and electronics applications, in the transport/automobile field, in textiles, in upholstered furniture and in construction.

A very effective flame-retardant class, developed in the last few years, based on nitrogen and preferably for polyolefins, is based on alkoxyamines (WO 99/00450, WO 2008101845, WO 2011086114). By splitting the bond of the alkoxyamines, radicals are produced in the case of fire which intervene in the decomposition process of the polymer and hence effect the flame-retardant effect (C. R. Wilen, R. Pfaendner, J. Appl. Pol. Sci. 129 (2013), 925-944, R. Pfaendner, C. R. Chemistry 9 (2006), 1338-1344). The alkoxyamines can also be used advantageously in synergistic combinations with other flame retardants (WO 02/074847, WO 03/016388, WO 2010026230, WO 2009080554, WO 2011003773, WO 2011117266). Furthermore, it was found that even hydroxylamine stabilisers can effect a synergistic improvement in the effect of bromine-containing, phosphorus-containing and inorganic flame retardants (WO 02/074847).

Many of the known and mentioned radical generators do not however fulfil all requirements for an effective flame retardant, such as e.g. adequate thermal stability, i.e. in the incorporation in plastic materials (compounding) at normal temperatures, premature i.e. undesired, decomposition of the flame retardant occurs already. As a result of this premature decomposition, the effect is reduced in the case of fire and/or has a negative influence on the properties of the plastic material to be protected, as a result of subsequent reactions. Therefore, there is a wish for radical generators which can be used as flame retardant or flame-retardant synergist, which have a sufficiently high temperature stability during plastic material processing, i.e. generally above 300° C., but then achieve a particularly good effect in the case of fire due to rapid decomposition.

It was therefore the object of the present invention to make available new flame retardants and synergistic flame-retardant components which are highly effective and have very good thermal stability.

This object is achieved by the use of specific N-hydroxybenzotriazoles and/or N-hydroxyindazoles as flame retardant for plastic materials as desribed herein, by the flame-retardant plastic material moulding compound which comprises at least one N-hydroxybenzotriazole and/or at least one N-hydroxyindazole as flame retardant as described herein, and by the advantageous developments thereof as described herein.

Hydroxybenzotriazole is an industrially available raw material which is used e.g. for peptide synthesis (B. Bacsa et al., J. Org. Chem. 2008, 73, 7532-7542). However, hydroxybenzotriazole is explosive in the dry state and sensitive to impact, is therefore stored in aqueous solution or moist and hence cannot normally be used for plastic material processing processes, in particular at the required processing temperatures. In contrast, the salts of hydroxybenzotriazole are thermally very stable compounds and generally decompose only above 300° C.

Benzotriazole derivatives in general are one of the best known classes of UV stabilisers, however these are structurally different (no hydroxybenzotriazoles and no salts, see e.g. Plastics Additives Handbook, 5$^{th}$ Edition, Publisher: H. Zweifel, Hanser, Munich 2001) and hence have no effect as flame retardant and/or flame-retardant synergist.

The use of salts of hydroxybenzotriazole in plastic materials and in particular as flame retardant has not been known to date.

Surprisingly, it has now emerged that N-hydroxybenzotriazole derivatives and/or N-hydroxyindazole derivatives are very well suited as flame retardant for plastic material compositions.

The invention hence relates to the use of a compound according to the general formulae I to IV

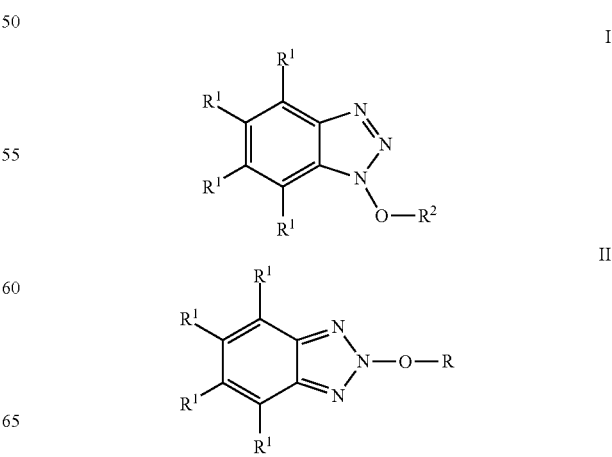

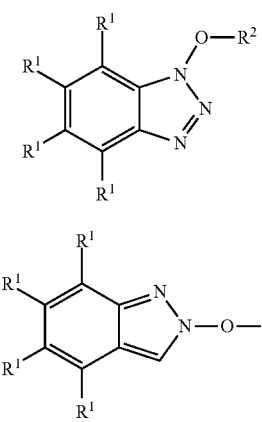

or a mixture of at least two compounds of the general formulae I to IV, wherein, with each occurrence, respectively independently of each other, R¹ is selected from the group consisting of hydrogen, alkyl radicals with 1 to 18 carbon atoms, partially or perfluorinated alkyl radicals with 1 to 18 carbon atoms, unsaturated organic radicals up to 1 to 18 carbon atoms, 2 vicinal radicals R¹ also being able to be joined to form a ring, —NO₂, —F, —Cl and —Br, and R² is selected from the group consisting of mono-, bi- or trivalent inorganic or organic cations and hydrogen, as flame retardant for plastic materials.

In the case of the above-mentioned compounds according to the general formulae I to IV, it is thereby preferred respectively if R¹ is selected from hydrogen and R² is selected from 1- or 2-valent inorganic or organic cations.

Amongst the compounds according to formulae I to IV, the compound according to formula I is particularly preferred.

According to a preferred embodiment, the mono-, di- or trivalent inorganic cations are selected from the group consisting of Li⁺, Na⁺, K⁺, ½ Mg²⁺, ½ Ca²⁺, ⅓ Al³⁺, ½ Zn²⁺ and/or the organic cations are selected from the group consisting of nitrogen- and/or phosphorus-containing organic cations, in particular ammonium, melaminium and phosphonium.

The above-used nomenclature in the case of the 2- or 3-valent cations (e.g. ½ Mg²⁺ etc.) indicates that the cation is present of course in the correct stoichiometric ratio with respect to the monovalent anion according to formulae I to IV.

It is advantageous in particular if, with each occurrence, R¹ is hydrogen and/or R² is a mono- or bivalent inorganic cation, in particular K⁺.

With respect to the plastic material to be protected, which can be equipped to be flame-retardant by using the above-mentioned compounds according to formulae I to IV, the present invention is subject to no restriction. Preferably, the plastic materials to be protected are thereby selected however from the group consisting of thermoplastic plastic materials, elastomers or duroplastic plastic materials, in particular a) polymers made of olefins or diolefins, such as e.g. polyethylene (LDPE, LLDPE, VLDPE, ULDPE, MDPE, HDPE, UHMWPE), metallocene-PE (m-PE), polypropylene, polyisobutylene, poly-4-methylpentene-1, polybutadiene, polyisoprene, polycyclooctene, polyalkylene-carbon monoxide copolymers, and also copolymers in form of statistical or block structures, such as e.g. polypropylene-polyethylene (EP), EPM or EPDM, ethylene-vinyl acetate (EVA), ethylene-acrylester, such as e.g. ethylene-butylacrylate, ethylene-acrylic acid and the salts thereof (ionomers), and also terpolymers, such as e.g. ethylene-acrylic acid-glycidylacrylate, graft polymers, such as e.g. polypropylene-graft-maleic anhydride, polyethylene-graft-acrylic acid, polyethylene-polybutylacrylate-graft-maleic anhydride.

b) polystyrene, polymethylstyrene, polyvinylnaphthalene, styrene-butadiene (SB), styrene-butadiene-styrene (SBS), styrene-ethylene-butylene-styrene (SEBS), styrene-ethylene-propylene-styrene, styrene-isoprene, styrene-isoprene-styrene (SIS), styrene-butadiene-acrylonitrile (ABS), styrene-acrylonitrile-acrylate (ASA), styrene-ethylene, styrene-maleic anhydride polymers including corresponding graft copolymers, such as e.g. styrene on butadiene, maleic anhydride on SBS or SEBS, and also graft copolymers made of methylmethacrylate, styrene-butadiene and ABS (MABS), c) halogen-comprising polymers, such as e.g. polyvinylchloride (PVC), polychloroprene and polyvinylidene chloride (PVDC), copolymers made of vinyl chloride and vinylidene chloride or of vinyl chloride and vinyl acetate, chlorinated polyethylene, polyvinylidene fluoride, d) polymers of unsaturated esters, such as e.g. polyacrylates and polymethacrylates, such as polymethylmethacrylate (PMMA), polybutylacrylate, polylaurylacrylate, polystearylacrylate, polyglycidylacrylate, polyglycidylmethacrylate, polyacrylonitrile, polyacrylamides, copolymers such as e.g. polyacrylonitrile-polyalkylacrylate, e) polymers made of unsaturated alcohols and derivatives, such as e.g. polyvinyl alcohol, polyvinylacetate, polyvinylbutyral, f) polyacetals, such as e.g. polyoxymethylene (POM) or copolymers with e.g. butanal, g) polyphenylene oxides and blends with polystyrene or polyamides, h) polymers of cyclic ethers, such as e.g. polyethylene glycol, polypropylene glycol, polyethylene oxide, polypropylene oxide, i) polyurethanes, made of hydroxy-terminated polyethers or polyesters and aromatic or aliphatic isocyanates, in particular linear polyurethanes, polyureas, j) polyamides, such as e.g. polyamide-6, 6.6, 6.10, 4.6, 4.10, 6.12, 12.12, polyamide 11, polyamide 12 and also (partially) aromatic polyamides, such as e.g. polyphthalamides, e.g. produced from terephthalic acid and/or isophthalic acid and aliphatic diamines or from aliphatic dicarboxylic acids, such as e.g. adipic acid or sebacic acid and aromatic diamines, such as e.g. 1,4- or 1,3-diaminobenzene, blends of different polyamides, such as e.g. PA-6 and PA 6.6 or blends of polyamides and polyolefins, such as e.g. PA/PP, k) polyimides, polyamideimides, polyetherimides, polyesterimides, poly(ether)ketones, polysulphones, polyethersulphones, polyarylsulphones, polyphenylene sulphide, polybenzimidazoles, polyhydantoins, l) polyesters made of aliphatic or aromatic dicarboxylic acids and diols or made of hydroxylcarboxylic acids, such as e.g. polyethylene terephthalate (PET), polybutylene terephthalate (PBT), polypropylene terephthalate, polyethylene naphthylate, poly-1,4-dimethylolcyclohexane terephthalate, polyhydroxybenzoate, polyhydroxynaphthalate, polylactic acid (PLA), polyhydroxybutyrate (PHB), polyhydroxyvalerate (PHV), m) polycarbonates, polyester carbonates, and also blends such as e.g. PC/ABS, PC/PBT, PC/PET/PBT, PC/PA, n) cellulose derivatives, such as e.g. cellulose nitrate, cellulose acetate, cellulose propionate, cellulose butyrate, o) non-thermoplastic or duroplastic materials, p) and also mixtures, combinations or blends of two or more of the previously mentioned polymers.

The use of the compounds according to the general formulae I to IV or of a mixture of at least two compounds of formulae I to IV resides preferably in the corresponding compounds being mixed with the plastic material. It is hereby advantageous that the total content of the compound according to the general formulae I and II in the resulting mixture is in particular 0.01 to 50% by weight, preferably 0.05 to 25% by weight.

In addition, the present invention relates to a flame-retardant plastic material moulding compound comprising at least one plastic material and also, as flame retardant, at least one compound according to the general formulae I to IV or a mixture of at least two compounds of the general formulae I to IV, wherein, with each occurrence, respectively independently of each other, $R^1$ is selected from the group consisting of hydrogen, alkyl radicals with 1 to 18 carbon atoms, partially or perfluorinated alkyl radicals with 1 to 18 carbon atoms, unsaturated organic radicals up to 1 to 18 carbon atoms, 2 vicinal radicals $R^1$ also being able to be joined to form a ring, —$NO^2$, —F, —Cl and —Br, and $R^2$ is selected from the group consisting of mono-, bi- or trivalent inorganic or organic cations and hydrogen.

With respect to the preferred selection of compounds I to IV, the same explanations as described already above apply.

According to a preferred embodiment, the total content of the at least one compound, according to the general formulae I to IV in the plastic material moulding compound, is 0.01 to 50% by weight, preferably 0.05 to 25% by weight.

It is thereby further advantageous that the plastic material moulding compound, in addition to the at least one compound according to the general formulae I to IV and the at least one plastic material, comprises in addition up to 70 parts by weight, preferably up to 25 parts by weight, relative to the totality of the at least one compound according to the general formulae I and II and of the at least one plastic material, of at least one further flame retardant, selected from the group consisting of phosphorus-containing, nitrogen-containing, inorganic, silicon-containing, boron-containing, halogen-containing, sulphur-containing and/or radical-forming flame retardants.

Provided the polymers indicated under a) to o) or mixtures or blends of two or more of these polymers concern copolymers, these can be present in the form of statistical ("random"), block- or "tapered" structures.

Provided the polymers indicated under a) to o) or mixtures or blends of two or more of these polymers concern stereoregular polymers, these can be present in the form of isotactic, stereotactic, but also atactic forms.

Furthermore, the polymers indicated under a) to o) or mixtures or blends of two or more of these polymers can have both amorphous and (partially) crystalline morphologies.

The mentioned polymers a) to o) can thereby be present not only as virgin material but also in the form of recyclates, e.g. as production waste or from useful material collections ("post-consumer" recyclates).

Possibly, the polyolefins mentioned under a) can also be present crosslinked, e.g. crosslinked polyethylene, which is then termed X-PE. The polyolefins mentioned under a) can have any stereostructures, i.e. isotactic, syndiotactic or atactic, or be present in stereo block structures.

Very particularly preferably, the organic oxyimides used according to the invention are used for polyolefins, in particular for the polyolefins mentioned under a).

Furthermore, the present flame retardants can be used in the following duromeric or elastomeric, non-thermoplastic plastic materials:

q) epoxy resins, consisting of di- or polyfunctional epoxy compounds in combination with e.g. hardeners based on amines, anhydrides, dicyanodiamide, mercaptans, isocyanates or catalytically acting hardeners, r) phenol resins, such as e.g. phenol-formaldehyde resins, urea-formaldehyde resins, melamine-formaldehyde resins, s) unsaturated polyester resins made of unsaturated dicarboxylic acids and diols, t) silicones, u) polyurethanes as reaction products from di- or polyfunctional isocyanates and polyols, polyureas, v) alkyd resins, allyl resins.

Likewise possible are mixtures, blends and combinations of the previously mentioned plastic materials amongst each other or mixtures and combinations with the plastic materials mentioned previously under a) to o).

Very particularly preferably, the flame retardants according to the invention are used in the case of polyolefins, preferably polypropylene and/or polyethylene and the copolymers and blends thereof.

It is preferred in particular if the flame retardants according to formulae I to IV, used according to the invention, are used in combination with at least one further flame retardant, as a result of which synergistic effects result.

The at least one further flame retardant is thereby selected preferably from the group consisting of a) inorganic flame retardants, such as e.g. $Al(OH)_3$, $Mg(OH)_2$, AlO(OH), $MgCO_3$, layer silicates, such as e.g. montmorillonite or sepiolite, organically- or unmodified double salts, such as e.g. Mg—Al silicates, POSS-(polyhedral oligomeric silsesquioxane) compounds, huntite, hydromagnesite or halloysite and also $Sb_2O_3$, $Sb_2O_5$, $MoO_3$, zinc stannate, zinc hydroxystannate, b) nitrogen-containing flame retardants, such as e.g. melamine, melem, melam, melon, melamine derivates, melamine condensation products or melamine salts, benzoguanamine, polyisocyanurates, allantoin, phosphacenes, in particular melamine cyanurate, melamine phosphate, dimelamine phosphate, melamine pyrophosphate, melamine polyphosphate, melamine methane phosphonate, melamine-metal phosphates, such as e.g. melamine aluminium phosphate, melamine zinc phosphate, melamine magnesium phosphate, and also the corresponding pyrophosphates and polyphosphates, ethylene diamine methane phosphonate, poly-[2,4-(piperazin-1,4-yl)-6-(morpholin-4-yl)-1,3,5-triazine], ammonium polyphosphate, melamine borate, melamine hydrobromide, c) radical formers, such as e.g. alkoxyamines, hydroxylamine esters, azo compounds, dicumyl or polycumyl, hydroxyimides or the derivates thereof, such as e.g. hydroxyamide ester or hydroxyamide ether, d) phosphorus-containing flame retardants, such as e.g. red phosphorus, phosphates, such as e.g. resorcin diphosphate, bisphenol-A-diphosphate and the oligomers thereof, triphenylphosphate, ethylenediamine diphosphate, phosphonates such as e.g. salts of hypophosphorous acid and the derivates thereof, such as alkylphosphinate salts, e.g. diethylphosphinate aluminium or diethylphosphinate zinc or aluminium phosphinate, aluminium phosphite, aluminium phosphonate, aluminium phosphate, phosphonate esters, oligomeric and polymeric derivatives of methane phosphonic acid, 9,10-dihydro-9-oxa-10-phosphoryl-phenanthrene-10-oxide (DOPO) and the substituted compounds thereof, e) halogen-containing flame retardants based on chlorine and bromine, such as e.g. polybrominated diphenyl oxides, such as e.g. decabromodiphenyl oxide, tris(3-bromo-2,2-bis(bromomethyl)propylphosphate, tris(tribromoneopentyl)phosphate, tetrabromophthalic acid, 1,2-bis(tribromophenoxy)ethane, hexabromocyclododecane, brominated diphenylethane, tris-(2,3-dibromopropyl)isocyanurate, ethylene-bis(tetrabromophthalimide), tetrabromobisphenol A, tetrabromobisphenol-A-bis(2,3-dibromopropyl ether), brominated polystyrene, brominated polybutadiene or polystyrene, brominated polybutadiene copolymers, brominated epoxy resin, polypentabromobenzylacrylate, brominated polyphenylene ether, possibly in combination with $Sb_2O_3$ and/or $Sb_2O_5$, f) borates, such as e.g. zinc borate or calcium borate, possibly on carrier materials such as silica, g) sulphur-containing compounds, such as e.g. elementary sulphur, disulphides and polysulphides, thiuramsulphide, dithiocarbamates, mercaptobenzothiazole and sulphenamides, h) anti-drip agents, such as e.g. polytetrafluoroethylene, i) silicon-containing compounds, such as e.g. polyphenylsiloxanes, j) carbon modifications, such as e.g. carbon nanotubes (CNT) or graphene.

The halogen-containing flame retardants, mentioned under e), frequently concern commercial products which are obtainable commercially, e.g. from the companies Albemarle, Chemtura/Great Lakes or ICL-IP.

In particular in combinations of the compounds according to formulae I to IV used according to the invention with at least one radical former as further flame retardant, synergistic effects are produced.

Radical formers in the sense of the present invention are compounds which can produce radicals by thermal- and light-induced splitting. Suitable radical formers for the applications present here are those which have sufficient thermal stability for the plastic material- or coating processing processes, i.e. during processing still produce no or only very small quantities of radicals and, only at higher temperatures as occur only in the case of fire, produce radicals spontaneously. The respective processing processes and temperatures for coatings and plastic material processing processes are known to the person skilled in the art. Plastic material processing processes and associated temperatures can however also be deduced from the technical literature, such as e.g. H. Domininghaus, P. Elsner, P. Eyerer, T. Hirth, Plastic Materials, 8$^{th}$ edition, Springer 2012.

The radical former is thereby selected preferably from the group consisting of N-alkoxyamines, —C—C— radical formers, radical formers with azo groups (—N=N—), radical formers with hydrazine groups (—NH—HN—), radical formers with hydrazine groups (>C=N—NH—), radical formers with azine groups (>C=N—N=C<), radical formers with triazene groups (—N=N—N<).

The production of suitable azo compounds is described for example in M. Aubert et al. Macromol. Sci. Eng. 2007, 292, 707-714 or in WO 2008101845, the production of hydrazones and azines in M. Aubert et al., Pol. Adv. Technol. 2011, 22, 1529-1538, the production of triazenes in W. Pawelec et al., Pol. Degr. Stab. 2012, 97, 948-954.

The radical former is thereby selected particularly preferably from the group consisting of a) N-alkoxyamines according to the subsequently illustrated structural formula

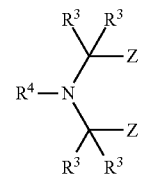

wherein
$R^3$ stands for hydrogen or a possibly substituted alkyl-, cycloalkyl, aryl-, heteroaryl- or acyl radical, in particular is a C1 to C4 alkyl radical,
$R^4$ stands for an alkoxy-, aryloxy-, cycloalkoxy-, aralkoxy- or acyloxy radical,
Z stands for hydrogen or a possibly substituted alkyl-, cycloalkyl-, aryl-, heteroaryl- or acyl radical, the two radicals Z also being able to form a closed ring which can be substituted possibly by ester-, ether-, amine, amide, carboxy- or urethane groups, b) azo compounds according to the subsequently illustrated structural formulae

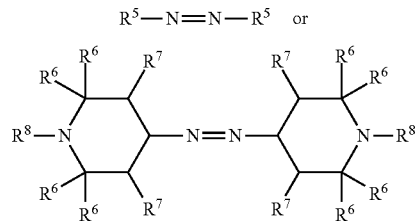

wherein
$R^5$ means an alkyl-, cycloalkyl- or aryl radical,
$R^6$ with each occurrence, is the same or different and means a linear or branched alkyl radical,
$R^7$ with each occurrence, is the same or different and means hydrogen or a linear or branched alkyl radical, and
$R^8$ with each occurrence, is the same or different and means an alkyl, alkoxy-, aryloxy-, cycloalkyloxy-, aralkoxy or acyloxy radical, c) dicumyl according to the subsequently illustrated structural formula

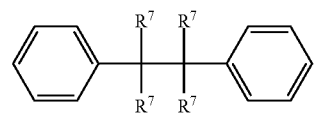

R⁷ having the previously indicated meaning, preferably being methyl,
d) and/or polycumyl according to the subsequently illustrated structural formula

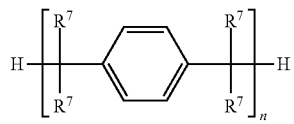

R⁷ having the previously indicated meaning, preferably being methyl, and 2<n<100.

Typical examples of the previously mentioned N-alkoxyamines of the indicated structure are thereby: 1-cyclohexyloxy-2,2,6,6-tetramethyl-4-octadecylaminopiperidine; bis(1-octyloxy-2,2,6,6-tetramethylpiperidin-4-yl) sebacate; 2,4-bis[(1-cyclohexyloxy-2,2,6,6-tetramethylpiperidin-4-yl)butylamino]-6-(2-hydroxyethylamino-S-triazine; bis(1-cyclohexyloxy-2,2,6,6-tetramethylpiperidin-4-yl)adipate; 2,4-bis[(1-cyclohexyloxy-2,2,6,6-tetramethylpiperidin-4-yl)butylamino]-6-chloro-S-triazine; 1-(2-hydroxy-2-methylpropoxy)-4-hydroxy-2,2,6,6-tetramethylpiperidine; 1-(2-hydroxy-2-methylpropoxy)-4-oxo-2,2,6,6-tetramethylpiperidine; 1-(2-hydroxy-2-methylpropoxy)-4-octadecanoyloxy-2,2,6,6-tetramethylpiperidine; bis(1-(2-hydroxy-2-methylpropoxy)-2,2,6,6-tetramethylpiperidin-4-yl)sebacate; bis(1-(2-hydroxy-2-methylpropoxy)-2,2,6,6-tetramethylpiperidin-4-yl)adipate; 2,4-bis{N-[1-(2-hydroxy-2-methylpropoxy)-2,2,6,6-tetramethylpiperidin-4-yl]-N-butylamino}-6-(2-hydroxyethylamino)-S-triazine); 4-piperidinol, 2,2,6,6-tetramethyl-1-(undecyloxy)-4,4'-carbonate; the reaction product of 2,4-bis[(1-cyclohexyloxy-2,2,6,6-tetramethylpiperidin-4-yl)butylamino]-6-chloro-S-triazine with N,N'-bis(3-aminopropylethylenediamine); the oligomer compound which is the condensation product of 4,4'-hexamethylene-bis(amino-2,2,6,6-tetramethylpiperidine) and 2,4-dichloro-6-[(1-cyclohexyloxy-2,2,6,6-tetramethyl-4-yl)butylamino]-S-triazine, closed at the ends with 2-chloro-4,6-bis(dibutylamino)-S-triazine; aliphatic hydroxylamine, such as e.g. distearylhydroxylamine; and also compounds of the formula

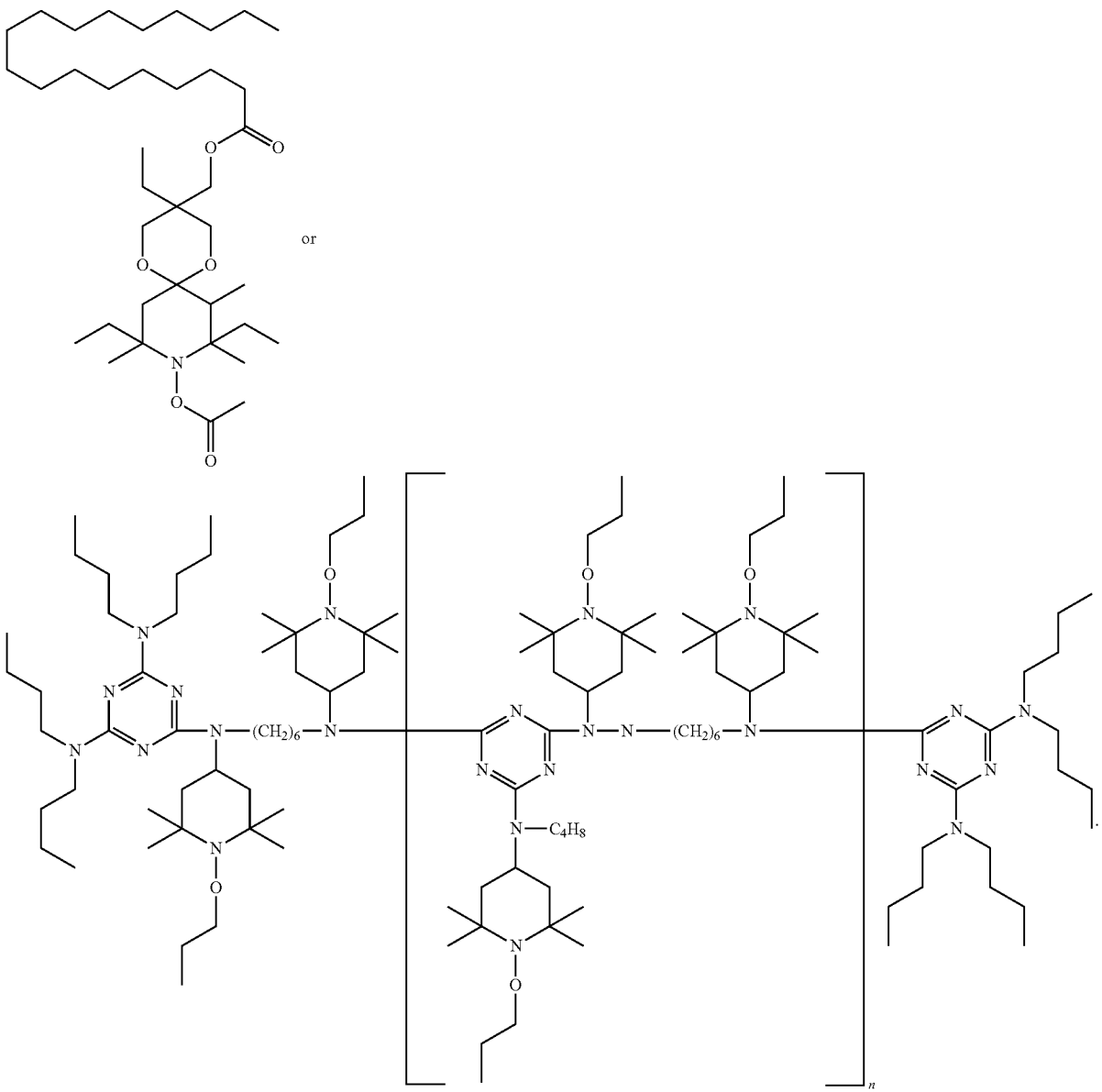

in which n = 1-15

The above-mentioned compounds are partially commercial products and are marketed under the following trade names: FLAMESTAB NOR 116®, TINUVIN NOR 371®, IRGATEC CR 76® from BASF SE, Hostavin NOW® from Clariant or ADK Stab LA 81® from Adeka. Dicumyl and polycumyl are commercial products which are obtainable for example from United Initiators.

Sulphur-containing flame retardants are likewise radical formers with disulphide or polysulphide groups (—S—S—) or thiol groups (—S—H), and also thiuramsulphides, such as e.g. tetramethylthiuramdisulphide, dithiocarbamates, such as e.g. zinc diethyldithiocarbamate or sodium dimethyldithiocarbamate, mercaptobenzothiazoles, such as e.g. 2-mercaptobenzothiazole and sulphenamides, such as e.g. N,N-dicyclohexyl-2-benzothiazole sulphenamide.

An example of a polysulphide is elementary sulphur, other polysulphides are described for example in U.S. Pat. No. 4,218,332.

Disulphides, polysulphides, thiols, thiuramsulphides, dithiocarbamates, mercaptobenzothiazoles and sulphenamides are obtainable commercially.

Further suitable radical formers are hydroxyimides and the derivatives thereof, such as hydroxyimide ester or hydroxyimide ether, as are described for example in WO 2014/154636.

The combination of the hydroxybenzotriazole salts according to the invention with another radical former can be advantageous in particular since here the radical formation can be effected at different decomposition temperatures or can be adjusted according to requirement.

The at least one further flame retardant can also be in particular a phosphorus-containing flame retardant. Preferred phosphorus-containing flame retardants are thereby phosphinates of the following structures:

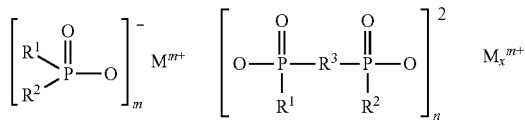

wherein R1 and R2 are preferably identical or different and are selected from linear or branched C1-C6 alkyl and/or aryl; M is selected from the group consisting of Mg, Ca, Al, Sb, Sn, Ge, Ti, Fe, Zr, Ce, Bi, Sr, Mn, Li, Na, K, Zn and/or a protonated nitrogen base, preferably calcium ions, magnesium ions, aluminium ions, and/or zinc ions; and m=1-4, preferably 2 or 3; n=1-4, preferably 1 or 3; x=1-4, is preferably 1 or 2. In a particularly preferred embodiment, $R_1$=alkyl, $R_2$=alkyl and M=Al or Zn.

A particularly preferred example of a phosphinate according to the invention is the commercially obtainable product Exolit OP® from Clariant SE.

Further preferred phosphorus-containing flame retardants are metal salts of hypophosphorous acid with a structure according to the formula

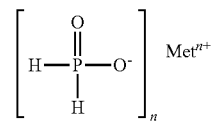

wherein Met is a metal, selected from groups I, II, III and IV of the periodic table of the elements and n is a number from 1 to 4 which corresponds to the charge of the corresponding metal ion Met. $Met^{n+}$ is for example $Na^+$, $Ca^{2+}$, $Mg^{2+}$, $Zn^{2+}$, $Ti^{4+}$ or $Al^{3+}$, wherein $Ca^{2+}$, $Zn^{2+}$ and $A^{3+}$ are particularly preferred.

The above-mentioned salts of hypophosphorous acid are partially available commercially, e.g. with the title Phoslite® from Italmatch Chemicals.

A further preferred group of phosphorus-containing flame retardants is phosphonates or phosphonic acid diaryl ester of a structure according to the following formula:

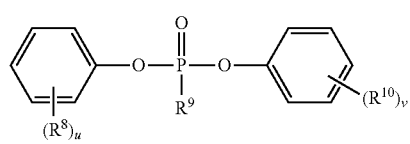

$R_8$ and $R_{10}$=H, being alkyl, preferably C1-C4 alkyl, $R_9$=C1-C4 alkyl, u=1-5 and v=1-5.

Corresponding structures can also be present in the form of phosphonate oligomers, polymers and copolymers. Linear or branched phosphonate oligomers and polymers are known from the state of the art. For branched phosphonate oligomers and polymers, reference is made to the U.S. Pat. Nos. 2,716,101, 3,326,852, 4,328,174, 4,331,614, 4,374,971, 4,415,719, 5,216,113, 5,334,692, 3,442,854, 6,291,630 B1, 6,861,499 B2 and 7,816,486 B2. For phosphonate oligomers, reference is made to the US patent applications US 2005/0020800 A1, US 2007/0219295 A1 and US 2008/0045673 A1. With respect to linear phosphonate oligomers and polymers, reference is made to the U.S. Pat. Nos. 3,946,093, 3,919,363, 6,288,210 B1, 2,682,522 and 2,891,915.

Polymeric and oligomeric phosphonates are obtainable for example with the trade name Nofia® from FRX Polymers.

A further preferred group of phosphorus-containing flame retardants are compounds based on oxaphosphorine oxide and the derivatives thereof with for example the following structures:

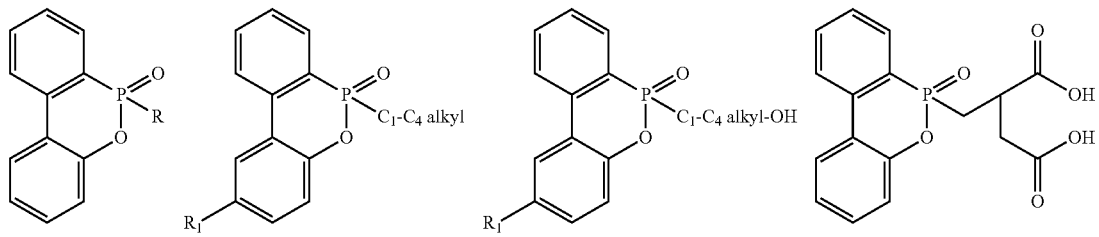

-continued
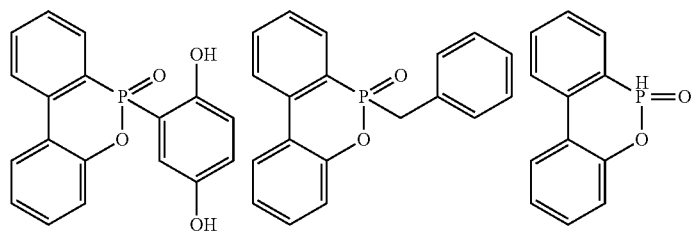
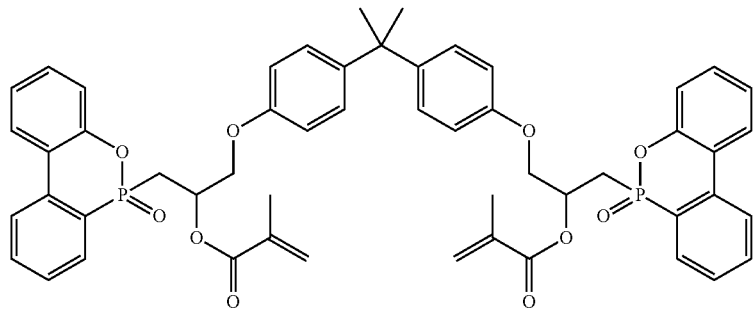
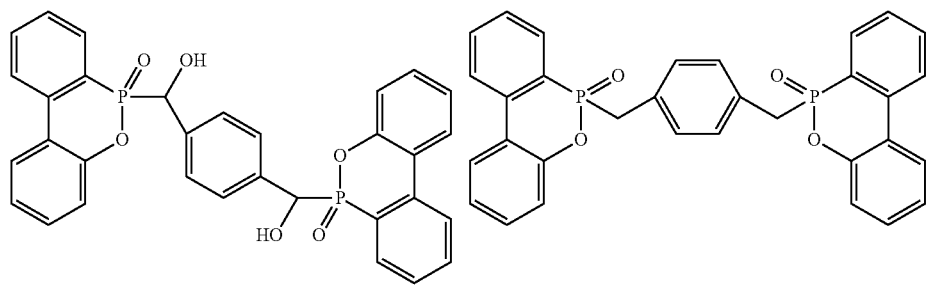
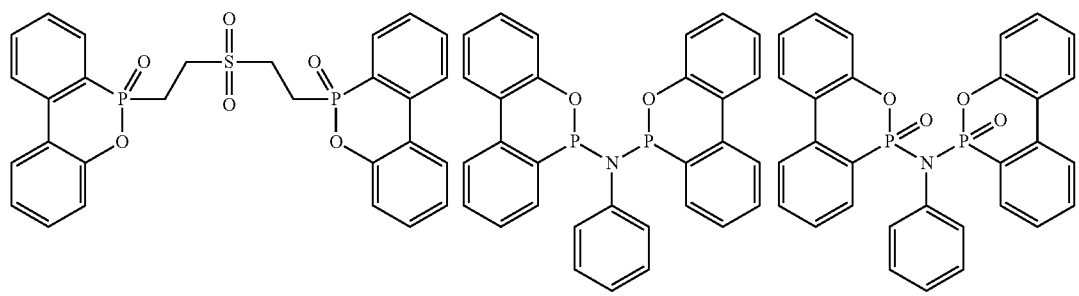
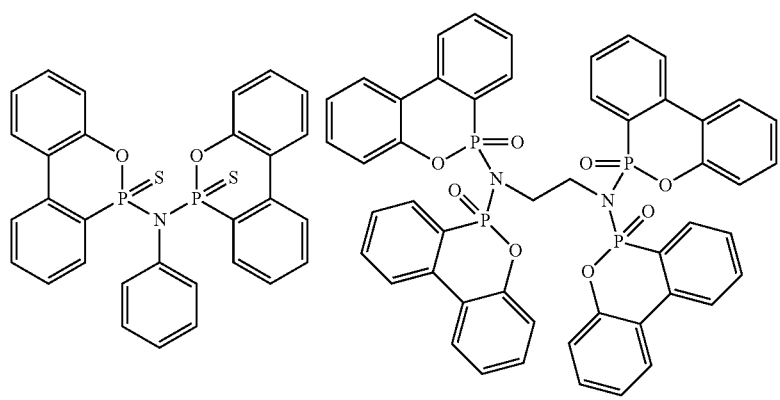

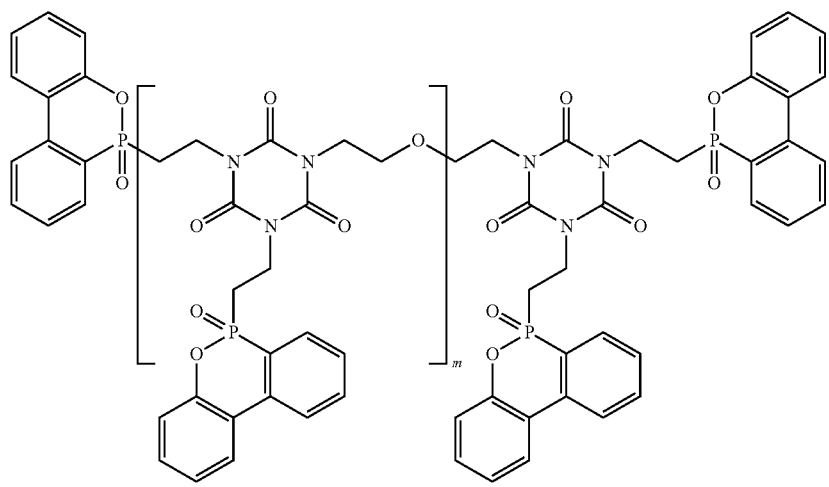
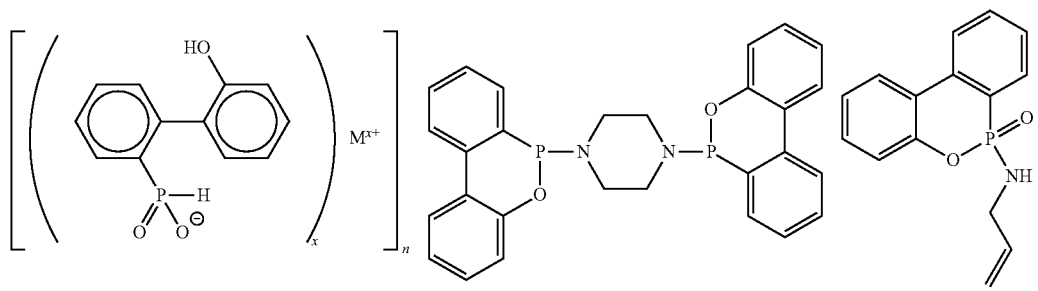
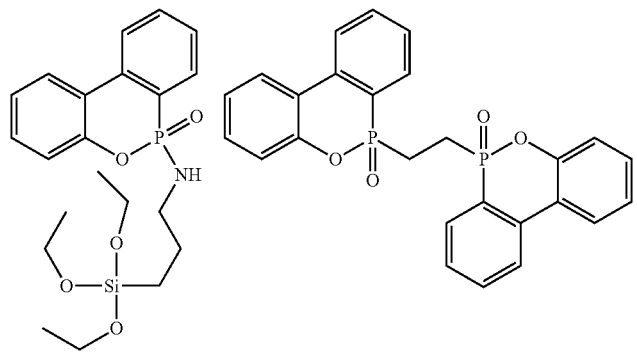
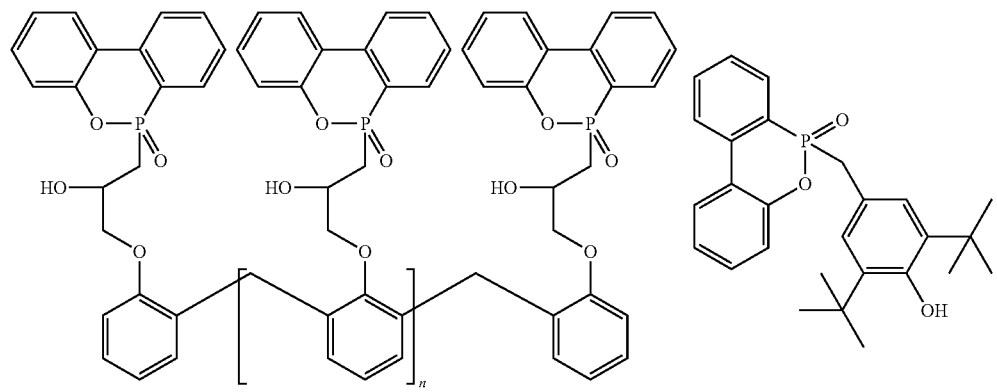

-continued

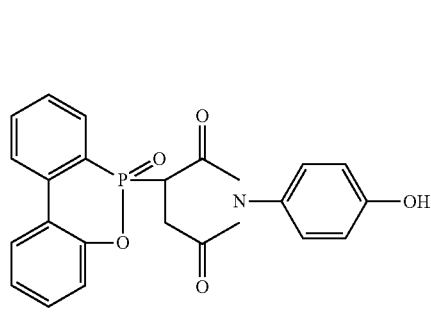
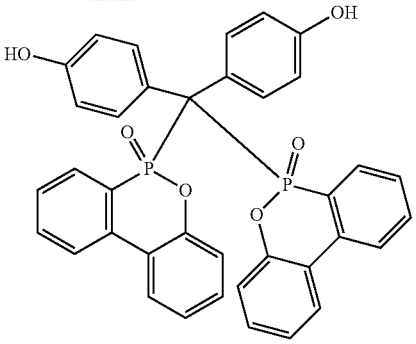

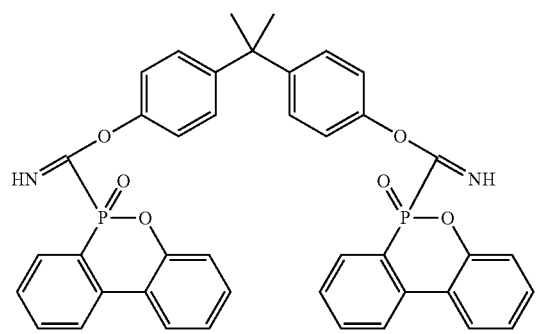

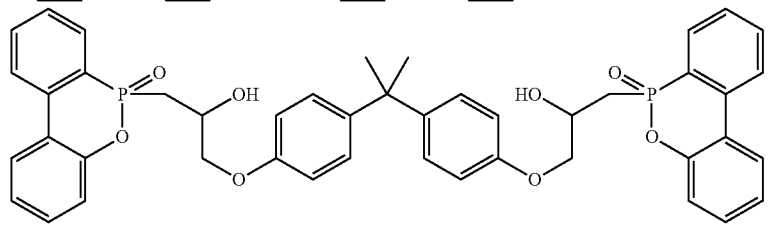

wherein M is a metal, selected from the second, third, twelfth or thirteenth group of the periodic table of the elements, x=2 or 3, n≥10 m=0–25, R=H, halogen or an aliphatic or aromatic radical with 1-32 C-atoms and $R_1$=H, C1-C6 alkyl.

Products based on oxaphosphorine oxide are commercially available for example under the trade name Ukanol® from Schill and Seilacher GmbH. Further compounds can be produced for example according to the patent specifications WO 2013020696, WO 2010135398, WO 03070736, WO 2006084488, WO 2006084489, WO 2011000019, WO 2013068437, WO 2013072295.

Further synergistic phosphorus-containing flame retardants are cyclic phosphonates of a structure according to the following formulae:

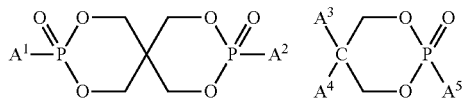

wherein $A^1$ and $A^2$, independently of each other, represent a substituted or unsubstituted, straight-chain or branched alkyl group with 1 to 4 carbon atoms, substituted or unsubstituted benzyl, substituted or unsubstituted phenyl, substituted or unsubstituted naphthyl, and wherein $A^3$ and $A^4$, independently of each other, are methyl or ethyl and $A^5$ is a straight-chain or branched alkyl group with 1 to 4 carbon atoms or a phenyl- or benzyl group which can have respectively up to 3 methyl groups.

Cyclic phosphonates are for example commercially available from the company Thor GmbH with the trade name Aflammit® or can be produced according to EP 2450401.

Further synergistic phosphorus-containing flame retardants are phosphacenes, in particular polymeric phosphacenes. A corresponding product is commercially available, for example with the title SPB-100, from Otsuka Chemicals.

The at least one further flame retardant can be in particular also a nitrogen-containing flame retardant. Preferred nitrogen-containing flame retardants are melamine polyphosphate, melamine cyanurate, melamine-metal phosphates, poly-[2,4-(piperazin-1,4-yl)-6-(morpholin-4-yl)-1,3,5-triazine] and ammonium polyphosphate. These compounds are commercial products and obtainable with the trade names Melapur® from BASF SE, Budit® from Budenheim Chemical Factory, Exolit AP® from Clariant, Safire® from Floridienne or MCA PPM triazines from MCA Technologies GmbH.

In the case of a combined use of the compounds according to formulae I to IV used according to the invention, with at least one further flame retardant, it is preferred if the previously mentioned compounds are used in a weight ratio (totality of the compounds according to formulae I to IV: flame retardant) of 99:1 to 1:99, preferably of 5:95 to 50:50, particularly preferably of 10:90 to 30:70.

In addition, additives can be selected from the group consisting of UV absorbers, light stabilisers, stabilisers, hydroxylamines, benzofuranones, metal deactivators, filler deactivators, nucleation agents, impact strength enhancers, plasticisers, lubricants, rheology modifiers, processing aids, pigments, colourants, optical brighteners, antimicrobial active substances, antistatic agents, slipping means, antiblocking means, coupling agents, chain lengtheners, dispersants, compatibilisers, oxygen collectors, acid collectors, marking means or antifogging means. In a preferred embodiment, the compositions comprise in particular acid collectors, e.g. based on salts of long-chain acids, such as e.g. calcium stearate, magnesium stearate, zinc stearate, calcium lactate, calcium stearoyl-2-lactylate or hydrotalcites and/or stabilisers from the group of phenolic antioxidants and of phosphites/phosphonites and/or light stabilisers from the group of hindered amines (HALS) and/or dispersants.

Suitable light stabilisers are for example compounds based on 2-(2'-hydroxyphenyl)benzotriazoles, 2-hydroxybenzophenones, esters of benzoic acids, acrylates, oxamides and 2-(2-hydroxyphenyl)-1,3,5-triazines.

Suitable 2-(2'-hydroxyphenyl)benzotriazoles are for example 2-(2'-hydroxy-5'-methylphenyl)benzotriazole, 2-(3',5'-di-tert-butyl-2'-hydroxyphenyl)benzotriazole, 2-(5'-tert-butyl-2'-hydroxyphenyl)benzotriazole, 2-(2'-hydroxy-5'-(1,1,3,3-tetramethylbutyl)phenyl)benzotriazole, 2-(3',5'-di-tert-butyl-2'-hydroxyphenyl)-5-chlorobenzotriazole, 2-(3'-tert-butyl-2'-hydroxy-5'-methylphenyl-5-chlorobenzotriazole, 2-(3'-sec-butyl-5'-tert-butyl-2'-hydroxyphenyl)benzotriazole, 2-(2'-hydroxy-4'-octyloxyphenyl)benzotriazole, 2-(3',5'-di-tert-amyl-2'-hydroxyphenyl)benzotriazole, 2-(3',5'-bis(α,α-dimethylbenzyl)-2'-hydroxyphenyl)benzotriazole, 2-(3'-tert-butyl-2'-hydroxy-5'-(2-octyloxy-carbonylethyl)phenyl)-5-chlorobenzotriazole, 2-(3'-tert-butyl-5'-[2-(2-ethylhexyloxy)carbonylethyl]-2'-hydroxyphenyl)-5-chlorobenzotriazole, 2-(3'-tert-butyl-2'-hydroxy-5'-(2-methoxycarbonylethyl)phenyl)-5-chlorobenzotriazole, 2-(3'-tert-butyl-2'-hydroxy-5'-(2-methoxycarbonylethyl) phenyl)benzotriazole, 2-(3'-tert-butyl-2'-hydroxy-5'-(2-octyloxycarbonylethyl)phenyl)benzotriazole, 2-(3'-tert-butyl-5'-[2-(2-ethylhexyloxy)carbonylethyl]-2'-hydroxyphenyl) benzotriazole, 2-(3'-dodecyl-2'-hydroxy-5'-methylphenyl) benzotriazole, 2-(3'-tert-butyl-2'-hydroxy-5'-(2-isooctyloxycarbonylethyl)phenylbenzotriazole, 2,2'-methylenebis[4-(1,1,3,3-tetramethylbutyl)-6-benzotriazol-2-ylphenol]; the product of transesterification of 2-[3'-tert-butyl-5'-(2-methoxycarbonylethyl)-2'-hydroxyphenyl]-2H-benzotriazole with polyethylene glycol 300; [R—CH$_2$CH$_2$—COO—CH$_2$CH$_2$—]—$_2$, R being=3'-tert-butyl-4'-hydroxy-5'-2H-benzotriazol-2-ylphenyl, 2-[2'-hydroxy-3'-(α,α-dimethylbenzyl)-5'-(1,1,3,3-tetramethylbutyl)phenyl], benzotriazole, 2-[2'-hydroxy-3'-(1,1,3,3-tetramethylbutyl)-5'-(α,α-dimethylbenzyl)phenyl] benzotriazole.

Suitable 2-hydroxybenzophenones are for example 4-hydroxy-, 4-methoxy-, 4-octyloxy-, 4-decyloxy-4-dodecyloxy, 4-benzyloxy, 4,2',4'-trihydroxy- and 2'-hydroxy-4,4'-dimethyoxy derivatives of 2-hydroxybenzophenones.

Suitable acrylates are for example ethyl-α-cyano-β,β-diphenylacrylate, isooctyl-α-cyano-β,β-diphenylacrylate, methyl-α-carbomethoxycinnamate, methyl-α-cyano-β-methyl-p-methoxycinnamate, butyl-α-cyano-β-methyl-p-methoxycinnamate, methyl-α-carbomethoxy-p-methoxycinnamate and N-((β-carbomethoxy-β-cyanovinyl)-2-methylindoline.

Suitable esters of benzoic acids are for example 4-tert-butylphenyl-salicylate, phenylsalicylate, octylphenylsalicylate, dibenzoylresorcinol, bis(4-tert-butylbenzoyl)resorcinol, benzoylresorcinol, 2,4-di-tert-butylphenyl-3,5-di-tert-butyl-4-hydroxybenzoate, hexadecyl-3,5-di-tert-butyl-4-hydroxybenzoate, octadecyl-3,5-di-tert-butyl-4-hydroxybenzoate, 2-methyl-4,6-di-tert-butylphenyl-3,5-di-tert-butyl-4-hydroxybenzoate.

Suitable oxamides are for example 4,4'-dioctyloxyoxanilide, 2,2'-diethoxyoxanilide, 2,2'-dioctyloxy-5,5'-di-tert-butoxanilide, 2,2'-didodecyloxy-5,5'-di-tert-butoxanilide, 2-ethoxy-2'-ethyloxanilide, N,N'-bis(3-dimethylaminopropyl)oxamide, 2-ethoxy-5-tert-butyl-2'-ethoxanilide and mixtures thereof with 2-ethoxy-2'-ethyl-5,4'-di-tert-butoxanilide, mixtures of o- and p-methoxy-disubstituted oxanilides and mixtures of o- and p-ethoxy-disubstituted oxanilides.

Suitable 2-(2-hydroxyphenyl)-1,3,5-triazines are for example 2,4,6-tris(2-hydroxy-4-octyloxyphenyl)-1,3,5-triazine, 2-(2-hydroxy-4-octyloxyphenyl)-4,6-bis(2,4-dimethylphenyl)-1,3,5-triazine, 2-(2,4-dihydroxyphenyl)-4,6-bis (2,4-dimethylphenyl)-1,3,5-triazine, 2,4-bis(2-hydroxy-4-propyloxyphenyl)-6-(2,4-dimethylphenyl)-1,3,5-triazine, 2-(2-hydroxy-4-octyloxyphenyl)-4,6-bis(4-methylphenyl-1,3,5-triazine, 2-(2-hydroxy-4-dodecyloxyphenyl)-4,6-bis(2,4-dimethylphenyl)-1,3,5-triazine, 2-(2-hydroxy-4-tridecyloxyphenyl)-4,6-bis(2,4-dimethylphenyl)-1,3,5-triazine, 2-[2-hydroxy-4-(2-hydroxy-3-butyloxypropoxy)phenyl]-4, 6-bis(2,4-dimethyl)-1,3,5-triazine, 2-[2-hydroxy-4-(2-hydroxy-3-octyloxypropyloxy)phenyl]-4,6-bis(2,4-dimethyl)-1,3,5-triazine, 2-[4-(dodecyloxy/tridecyloxy-2-hydroxypropoxy)-2-hydroxyphenyl]-4,6-bis(2,4-dimethylphenyl)-1,3,5-triazine, 2-[2-hydroxy-4-(2-hydroxy-3-dodecyloxypropoxy)phenyl]-4,6-bis(2,4-dimethylphenyl-1,3,5-triazine, 2-(2-hydroxy-4-hexyloxy) phenyl-4,6-diphenyl-1,3,5-triazine, 2-(2-hydroxy-4-methoxyphenyl)-4,6-diphenyl-1,3,5-triazine, 2,4,6-tris[2-hydroxy-4-(3-butoxy-2-hydroxypropoxy)phenyl]-1,3,5-triazine, 2-(2-hydroxyphenyl)-4-(4-methoxyphenyl)-6-phenyl-1,3,5-triazine, 2-{2-hydroxy-4-[3-(2-ethylhexyl-1-oxy)-2-hydroxypropyloxy]phenyl}-4,6-bis(2,4-dimethylphenyl-1,3,5-triazine.

Suitable metal deactivators are for example N,N'-diphenyloxamide, N-salicylal-N'-salicyloylhydrazine, N,N'-bis(salicyloyl)hydrazine, N,N'-bis(3,5-di-tert-butyl-4-hydroxyphenylpropionyl) hydrazine, 3-salicyloylamino-1,2,4-triazole, bis(benzylidene)oxalyldihydrazide, oxanilide, isophthaloyldihydrazide, sebacoylbisphenylhydrazide, N,N'-diacetyladipoyldihydrazide, N,N'-bis(salicyloyl)oxylyldihydrazide, N,N'-bis(salicyloyl)thiopropionyldihydrazide.

The following structures are suitable in particular as metal deactivators:

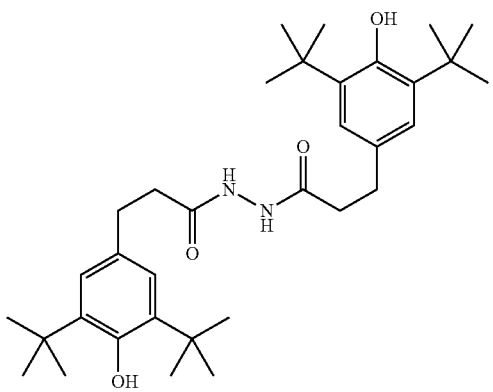

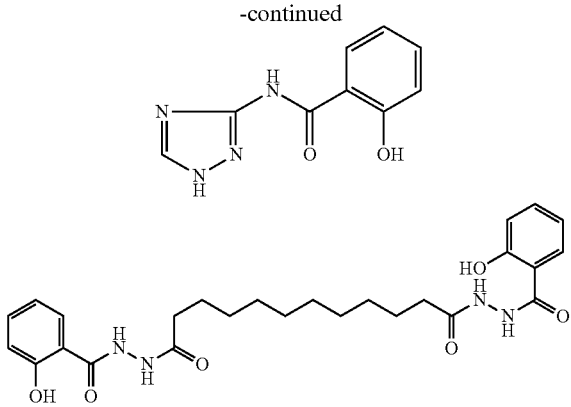

Suitable phenolic antioxidants are for example:
alkylated monophenols, such as e.g. 2,6-di-tert-butyl-4-methylphenol, 2-tert-butyl-4,6-dimethylphenol, 2,6-di-tert-butyl-4-ethylphenol, 2,6-di-tert-butyl-4-N-butylphenol, 2,6-di-tert-butyl-4-isobutylphenol, 2,6-dicyclopentyl-4-methylphenol, 2-(α-methylcyclohexyl)-4,6-dimethylphenol, 2,6-dioctadecyl-4-methylphenol, 2,4,6-tricyclohexylphenol, 2,6-di-tert-butyl-4-methoxymethylphenol, linear or branched nonylphenols, such as e.g. 2,6-dinonyl-4-methylphenol, 2,4-dimethyl-6-(1'-methylundec-1'-yl)phenol, 2,4-dimethyl-6-(1'-methylheptadec-1'-yl)phenol, 2,4-dimethyl-6-(1'-methyltridec-1'-yl)phenol and mixtures hereof;
alkylthiomethylphenols, such as e.g. 2,4-dioctylthiomethyl-6-tert-butylphenol, 2,4-dioctylthiomethyl-6-methylphenol, 2,4-dioctylthiomethyl-6-ethylphenol, 2,6-didodecylthiomethyl-4-nonylphenol;
hydroquinones and alkylated hydroquinones, such as e.g. 2,6-di-tert-butyl-4-methyoxyphenol, 2,5-di-tert-butylhydroquinone, 2,5-di-tert-amylhydroquinone, 2,6-diphenyl-4-octadecyloxyphenol, 2,6-di-tert-butylhydroquinone, 2,5-di-tert-butyl-4-hydroxyanisole, 3,5-di-tert-butyl-4-hydroxyanisole, 3,5-di-tert-butyl-4-hydroxyphenylstearate, bis(3,5-di-tert-butyl-4-hydroxylphenyl)adipate;
tocopherols, such as e.g. α-, β-, γ-, δ-tocopherol and mixtures of these (vitamin E);
hydroxylated thiodiphenyl ethers, such as e.g. 2,2'-thiobis(6-tert-butyl-4-methylphenol), 2,2'-thiobis(4-octylphenol), 4,4'-thiobis(6-tert-butyl-3-methylphenol), 4,4'-thiobis(6-tert-butyl-2-methylphenol), 4,4'-thiobis(3,6-di-see-amylphenol), 4,4'-bis(2,6-dimethyl-4-hydroxyphenyl)disulphide;
alkylidene bisphenols, such as e.g. 2,2'methylenebis(6-tert-butyl-4-methylphenol), 2,2'-methylenebis(6-tert-butyl-4-ethylphenol), 2,2'-methylenebis[4-methyl-6-(α-methylcyclohexyl) phenol], 2,2'-methylenebis(4-methyl-6-cyclohexylphenol), 2,2'-methylenebis(6-nonyl-4-methylphenol), 2,2'-methylenebis(4,6-di-tert-butylphenol), 2,2'-ethylidenebis(4,6-di-tert-butylphenol), 2,2'-ethylidenebis(6-tert-butyl-4-isobutylphenol), 2,2'-methylenebis[6-(α-methylbenzyl)-4-nonylphenol], 2,2'-methylenebis[6-(α,α-dimethylbenzyl)-4-nonylphenol], 4,4'-methylenebis(2,6-di-tert-butylphenol), 4,4'-methylenebis(6-tert-butyl-2-methylphenol), 1,1-bis(5-tert-butyl-4-hydroxy-2-methylphenyl) butane, 2,6-bis(3-tert-butyl-5-methyl-2-hydroxybenzyl)-4-methylphenol, 1,1,3-tris(5-tert-butyl-4-hydroxy-2-methylphenyl) butane, 1,1-bis(5-tert-butyl-4-hydroxy-2-methylphenyl)-3-N-dodecylmercaptobutane, ethylene glycol-bis[3,3-bis(3'-tert-butyl-4'-hydroxyphenyl) butyrate], bis(3-tert-butyl-4-hydroxy-5-methylphenyl)dicyclopentadiene, bis[2-(3'-tert-butyl-2'-hydroxy-5'-methylbenzyl)-6-tert-butyl-4-methylphenyl]terephthalate, 1,1-bis-(3,5-dimethyl-2-hydroxyphenyl) butane, 2,2-bis(3,5-di-tert-butyl-4-hydroxyphenyl)propane, 2,2-bis-(5-tert-butyl-4-hydroxy-2-methylphenyl)-4-N-dodecylmercaptobutane, 1,1,5,5-tetra(5-tert-butyl-4-hydroxy-2-methylphenyl)pentane;
O-, N- and S-benzyl compounds, such as e.g. 3,5,3',5'-tetra-tert-butyl-4,4'-dihydroxydibenzyl ether, octadecyl-4-hydroxy-3,5-dimethylbenzylmercaptoacetate, tridecyl-4-hydroxy-3,5-di-tert-butylbenzylmercaptoacetate, tris(3,5-di-tert-butyl-4-hydroxybenzyl)amine, bis(4-tert-butyl-3-hydroxy-2,6-dimethylbenzyl)dithioterephthalate, bis(3,5-di-tert-butyl-4-hydroxybenzylsulphide, isooctyl-3,5-di-tert-butyl-4-hydroxybenzylmercaptoacetate;
hydroxybenzylated malonates, such as e.g. dioctadecyl-2,2-bis(3,5-di-tert-butyl-2-hydroxybenzyl)malonate, dioctadecyl-2-(3-tert-butyl-4-hydroxy-5- methyl-benzyl) malonate, didodecylmercaptoethyl-2,2-bis(3,5-di-tert-butyl-4-hydroxybenzyl)malonate, bis[4-(1,1,3,3-tetramethylbutyl)phenyl]-2,2-bis(3,5-di-tert-butyl-4-hydroxybenzyl)malonate;
aromatic hydroxybenzyl compounds, such as e.g. 1,3,5-tris(3,5-di-tert-butyl-4-hydroxybenzyl)-2,4,6-trimethylbenzene, 1,4-bis(3,5-di-tert-butyl-4-hydroxybenzyl)-2,3,5,6-tetramethylbenzene, 2,4,6-tris(3,5-di-tert-butyl-4-hydroxybenzyl)phenol;
triazine compounds, such as e.g. 2,4-bis(octylmercapto)-6-(3,5-di-tert-butyl-4-hydroxyanilino)-1,3,5-triazine, 2-octylmercapto-4,6-bis(3,5-di-tert-butyl-4-hydroxyanilino)-1,3,5-triazine, 2-octylmercapto-4,6-bis(3,5-di-tert-butyl-4-hydroxyphenoxy)-1,3,5-triazine, 2,4,6-tris(3,5-di-tert-butyl-4-hydroxyphenoxy)-1,2,3-triazine, 1,3,5-tris(3,5-di-tert-butyl-4-hydroxybenzyl)isocyanurate, 1,3,5-tris(4-tert-butyl-3-hydroxy-2,6-dimethylbenzyl)isocyanurate, 2,4,6-tris(3,5-di-tert-butyl-4-hydroxphenylethyl)-1,3,5-triazine, 1,3,5-tris(3,5-di-tert-butyl-4-hydroyphenylpropionyl)hexahydro-1,3,5-triazine, 1,3,5-tris(3,5-dicyclohexyl-4-hydroxybenzyl)isocyanurate;
benzylphosphonates, such as e.g. dimethyl-2,5-di-tert-butyl-4-hydroxybenzylphosphonate, diethyl-3,5-di-tert-butyl-4-hydroxybenzylphosphonate, dioctadecyl-3,5-di-tert-butyl-4-hydroxybenzylphosphonate, dioctadecyl-5-tert-butyl-4-hydroxy-3-methylbenzylphosphonate, the calcium salt of the monoethyl ester of 3,5-di-tert-butyl-4-hydroxybenzyl-phosphonic acid;
acylaminophenols, such as e.g. 4-hydroxylauranilide, 4-hydroxystearanilide, octyl-N-(3,5-di-tert-butyl-4-hydroxyphenyl)carbamate;
esters of β-(3,5-di-tert-butyl-4-hydroxy-3-phenyl)propionic acid with mono- or multivalent alcohols e.g. methanol, ethanol, n-octanol, i-octanol, octadecanol, 1,6-hexanediol, 1,9-nonanediol, ethylene glycol, 1,2-propanediol, neopentylglycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane; 3,9-bis[2-{3-(3-tert-butyl-4-hydroxy-5-methylphenyl)propionyloxy}-1,1-dimethylethyl]-2,4,8,10-tetraoxaspiro [5.5]undecane;
esters of β-(3,5-dicyclohexyl-4-hydroxyphenyl)propionic acid with mono- or multivalent alcohols, e.g. methanol, ethanol, octanol, octadecanol, 1,6-hexanediol, 1,9-nonanediol, ethylene glycol, 1,2-propanediol, neopentylglycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane;

esters of 3,5-di-tert-butyl-4-hydroxyphenyl)acetic acid with mono- or multivalent alcohols, e.g. methanol, ethanol, octanol, octadecanol, 1,6-hexanediol, 1,9-nonanediol, ethylene glycol, 1,2-propanediol, neopentylglycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane;

amides of β-(3,5-di-tert-butyl-4-hydroxyphenyl)propionic acid, such as e.g. N,N'-bis(3,5-di-tert-butyl-4-hydroxyphenylpropionyl)hexamethylene diamide, N,N'-bis(3,5-di-tert-butyl-4-hydroxyphenylpropionyl)hexamethylene diamide, N,N'-bis(3,5-di-tert-butyl-4-hydroxyphenylpropionyl)hexamethylene diamide, N,N'-bis(3,5-di-tert-butyl-4-hydroxyphenylpropionyl)hydrazide, N,N'-bis[2-(3-[3,5-di-tert-butyl-4-hydroxyphenyl]propionyloxy)ethyl]oxamide (Naugard® XL-1, marketed by Uniroyal);

ascorbic acid (vitamin C).

Particularly preferred phenolic antioxidants are:
octadecyl-3-(3,5-di-tert-butyl-4-hydroxyphenyl) propionate, pentaerythritol-tetrakis[3-(3,5-di-tert-butyl-4-hydroxyphenyl) propionate, tris(3,5-di-tert-butyl-4-hydroxyphenyl)isocyanurate, 1,3,5-trimethyl-2,4,6-tris(3,5-di-tert-butyl-4-hydroxyphenyl)isocyanurate, 1,3,5-trimethyl-2,4,6-tris(3,5-di-tert-butyl-4-hydroxybenzyl)benzene, triethylene glycol-bis[3-(3-tert-butyl-4-hydroxy-5-methylphenyl) propionate, N, N'-hexane-1,6-diyl-bis[3-(3,5-di-tert-butyl-4-hydroxyphenyl)propionic acid amide.

Suitable phosphites/phosphonites are for example:
Triphenyl phosphite, diphenylalkyl phosphites, phenyldialkyl phosphites, tri(nonylphenyl) phosphite, trilauryl phosphites, trioctadecyl phosphite, distearylpentaerythritol diphosphite, tris-(2,4-di-tert-butylphenyl)phosphite, diisodecylpentaerythritol diphosphite, bis(2,4-di-tert-butylphenyl) pentaerythritol diphosphite, bis(2,4-di-cumylphenyl) pentaerythritol diphosphite, bis(2,6-di-tert-butyl-4-methylphenyl)pentaerythritol diphosphite, diisodecyloxypentaerythritol diphosphite, bis(2,4-di-tert-butyl-6-methylphenyl)pentaerythritol diphosphite, bis(2,4,6-tris(tert-butylphenyl)pentaerythritol diphosphite, tristearylsorbitol triphosphite, tetrakis(2,4-di-tert-butylphenyl)-4,4'-biphenylene diphosphonite, 6-isooctyloxy-2,4,8,10-tetra-tert-butyl-12H-dibenzo[d,g]-1,3,2-dioxaphosphocine, bis(2,4-di-tert-butyl-6-methylphenyl)methyl phosphite, bis(2,4-di-tert-butyl-6-methylphenyl)ethyl phosphite, 6-fluoro-2,4,8,10-tetra-tert-butyl-12-methyldibenzo[d,g]-1,3,2-dioxaphosphocine, 2,2'2"-nitrilo[triethyltris(3,3",5,5'-tetra-tert-butyl-1,1'-biphenyl-2,2'-diyl)phosphite], 2-ethylhexyl (3,3',5,5'-tetra-tert-butyl-1,1'-biphenyl-2,2'-diyl))phosphite, 5-butyl-5-ethyl-2-(2,4,6-tri-tert-butylphenoxy)-1,3,2-dioxaphosphirane.

Particularly preferred phosphites/phosphonites are:

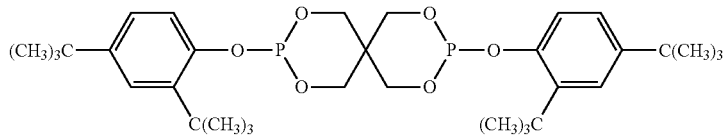

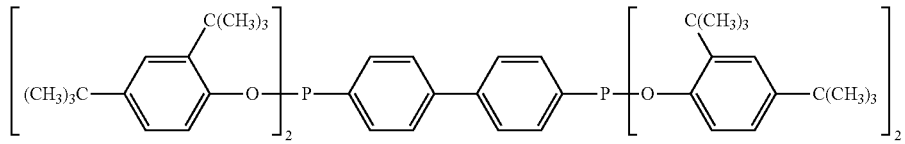

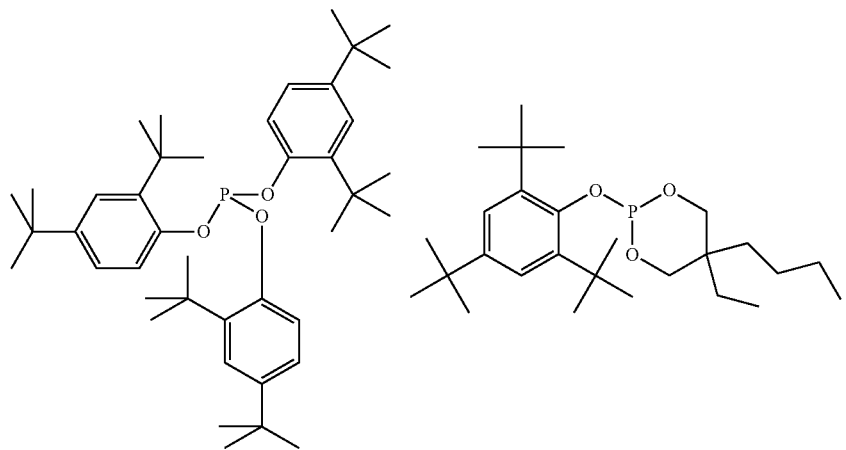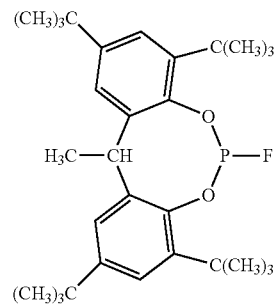

-continued
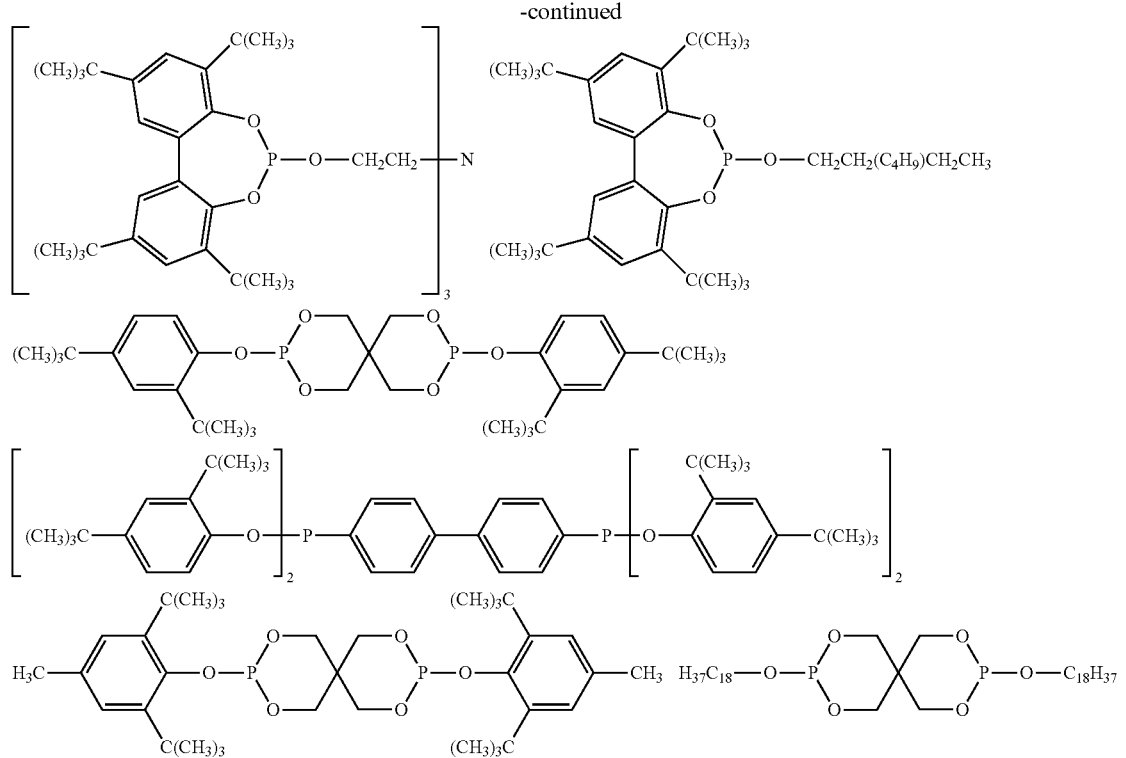
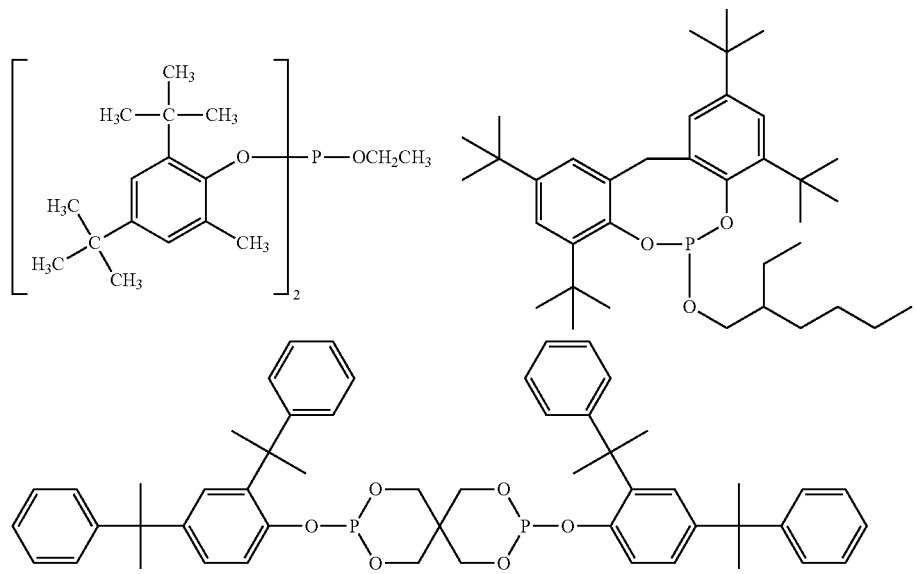
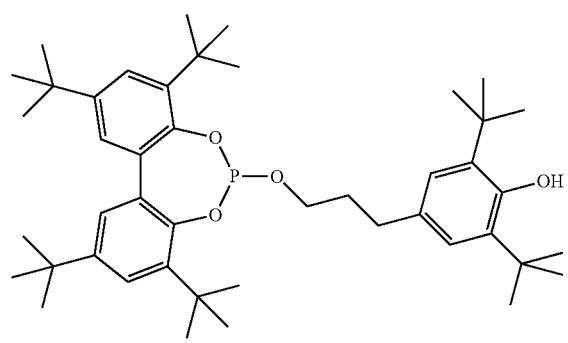

Further suitable stabilisers are aminic antioxidants. Suitable aminic antioxidants are for example:

N,N'-di-isopropyl-p-phenylene diamine, N,N'-di-sec-butyl-p-phenylene diamine, N,N'-bis(1,4-dimethylpentyl)-p-phenylene diamine, N,N'-bis(1-ethyl-3-methylpentyl)-p-phenylene diamine, N,N'-bis(1-methylheptyl)-p-phenylene diamine, N,N'-dicyclohexyl-p-phenylene diamine, N,N'-diphenyl-p-phenylene diamine, N,N'-bis(2-naphthyl)-p-phenylene diamine, N-isopropyl-N'-phenyl-p-phenylene diamine, N-(1,3-dimethylbutyl)-N'-phenyl-p-phenylene diamine, N-(1-methylheptyl)-N'-phenyl-p-phenylene diamine, N-cyclohexyl-N'-phenyl-p-phenylene diamine, 4-(p-toluenesulphamoyl)diphenylamine, N,N'-dimethyl-N,N'-di-sec-butyl-p-phenylene diamine, diphenylamine, N-allyldiphenylamine, 4-isopropoxydiphenylamine, N-phenyl-1-naphthylamine, N-(4-tert-octylphenyl)-1-naphthylamine, N-phenyl-2-naphthylamine, octylated diphenylamine, e.g. p,p'-di-tert-octyldiphenylamine, 4-N-butylaminophenol, 4-butyrylaminophenol, 4-nonanoylaminophenol, 4-dodecanoylaminophenol, 4-octadecanoylaminophenol, bis(4-methoxyphenyl)amine, 2,6-di-tert-butyl-4-dimethylaminomethylphenol, 2,4'-diaminodiphenylmethane, 4,4'-diaminodiphenylmethane, N,N,N',N'-tetramethyl-4,4'-diaminodiphenylmethane, 1,2-bis[(2-methylphenyl)amino] ethane, 1,2-bis(phenylamino) propane, (o-tolyl)biguanide, bis[4-(1',3'-dimethylbutyl)phenyl]amine, tert-octylated N-phenyl-1-naphthylamine, a mixture of mono- and dialkylated tert-butyl/tert-octyldiphenylamines, a mixture of mono- and dialkylated nonyldiphenylamines, a mixture of mono- and dialkylated dodecyldiphenylamines, a mixture of mono- and dialkylated isopropyl/isohexyldiphenylamines, a mixture of mono- and dialkylated tert-butyldiphenylamines, 2,3-dihydro-3,3-dimethyl-4H-1,4-benzothiazine, phenothiazine, a mixture of mono- and dialkylated tert-butyl/tert-octylphenothiazines, a mixture of mono- and dialkylated tert-octylphenothiazines, N-allylphenothiazine, N,N,N',N'-tetraphenyl-1,4-diaminobut-2-ene and also mixtures or combinations hereof.

Further suitable aminic antioxidants are hydroxylamines or N-oxides (nitrons), such as e.g. N,N-dialkylhydroxylamines, N,N-dibenzylhydroxylamine, N,N-dilaurylhydroxylamine, N,N-distearylhydroxylamine, N-benzyl-α-phenyl-nitron, N-octadecyl-α-hexadecylnitron, and also Genox EP (Addivant) according to the formula:

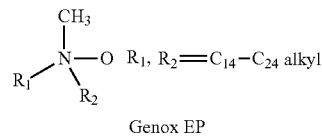

Genox EP

Further suitable stabilisers are thiosynergists. Suitable thiosynergists are for example distearylthiodipropionate, dilauryldipropionate or the compound according to the following formula:

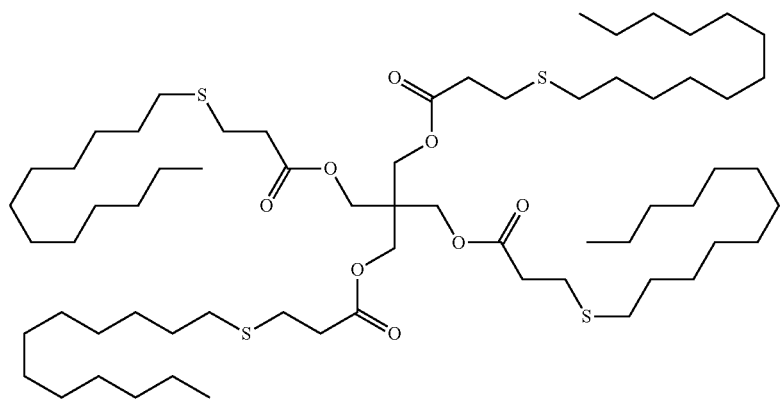 [SMILES: CCCCCCCCCCCCSCCC(=O)OCC(COC(=O)CCSCCCCCCCCCCCC)(COC(=O)CCSCCCCCCCCCCCC)COC(=O)CCSCCCCCCCCCCCC]

Further suitable stabilisers in particular for polyamides are copper salts, such as e.g. copper-(I)-iodide, copper-(I)-bromide or copper complexes, such as e.g. triphenylphosphine-copper-(I) complexes.

Suitable hindered amines are for example 1,1-bis(2,2,6,6-tetramethyl-4-piperidyl)succinate, bis(1,2,2,6,6-pentamethyl-4-piperidyl)sebacate, bis(1-octyloxy-2,2,6,6-tetramethyl-4-piperidyl)sebacate, bis(1,2,2,6,6-pentamethyl-4-piperidyl)-N-butyl-3,5-di-tert-butyl-4-hydroxybenzylmalonate, the condensation product of 1-(2-hydroxyethyl)-2,2,6,6-tetramethyl-4-hydroxypiperidine and succinic acid, linear or cyclic condensation products of N,N'-bis(2,2,6,6-tetramethyl-4-piperidyl) hexamethylene diamine and 4-tert-octylamino-2,6-dichloro-1,3,5-triazine, tris(2,2,6,6-tetramethyl-4-piperidyl)nitrilotriacetate, tetrakis (2,2,6,6-tetra-methyl-4-piperidyl)-1,2,3,4-butane tetracarboxylate, 1,1'-(1,2-ethanediyl)-bis(3,3,5,5-tetramethylpiperazinone), 4-benzoyl-2,2,6,6-tetramethylpiperidine, 4-stearyloxy-2,2,6,6-tetramethylpiperidine, linear or cyclic condensation products of N,N'-bis(2,2,6,6-tetramethyl-4-piperidyl)hexamethylene diamine and 4-morpholino-2,6-dichloro-1,3,5-triazine, the reaction product of 7,7,9,9-tetramethyl-2-cycloundecyl-1-oxa-3,8-diaza-4-oxospiro-[4,5] decane and epichlorohydrin.

Suitable dispersants are for example:
polyacrylates, e.g. copolymers with long-chain side groups, polyacrylate block copolymers, alkylamides: e.g. N,N'-1,2-ethanediylbisoctadecanamide sorbitan ester, e.g. monostearylsorbitan ester, titanates and zirconates, reactive copolymers with functional groups e.g. polypropylene-co-acrylic acid, polypropylene-co-maleic anhydride, polyethylene-co-glycidylmethacrylate, polystyrene-alt-maleic anhydride-polysiloxanes: e.g. dimethylsilanediol-ethylene oxide copolymer, polyphenylsiloxane copolymer, amphiphilic copolymers: e.g. polyethylene-block-polyethylene oxide, dendrimers, e.g. hydroxyl group-containing dendrimers.

Suitable nucleation means are for example talc, alkali or alkaline earth salts of mono- and polyfunctional carboxylic acids, such as e.g. benzoic acid, succinic acid, adipic acid, e.g. sodium benzoate, zinc glycerolate, aluminium hydroxy-bis(4-tert-butyl)benzoate, benzylidene sorbitols, such as e.g. 1,3:2,4-bis(benzylidene)sorbitol or 1,3:2,4-bis(4-methylbenzylidene)sorbitol, 2,2'-methylene-bis-(4,6-di-tert-butylphenyl)phosphate, and also trisamides, such as e.g. according to the following structures

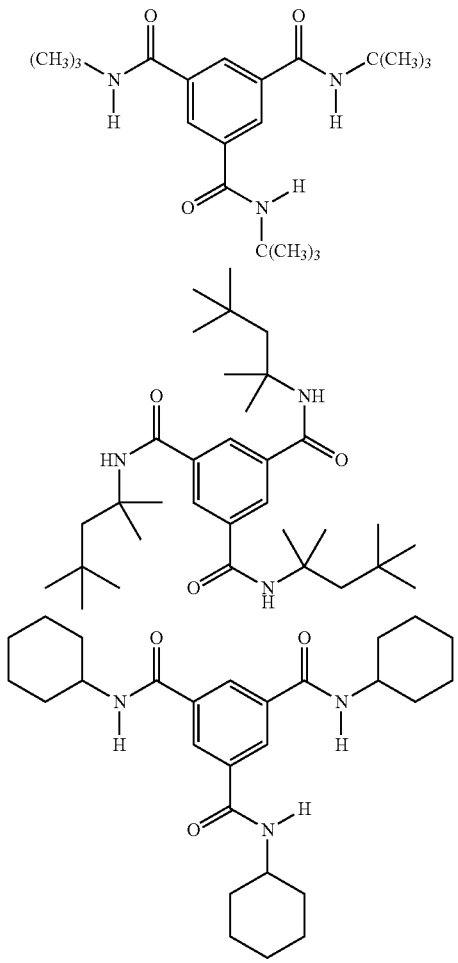

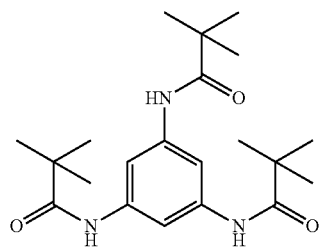

Suitable filling- and reinforcing materials are for example synthetic or natural materials, such as e.g. calcium carbonate, silicates, glass fibres, glass balls (solid or hollow), talc, mica, kaolin, barium sulphate, metal oxides and metal hydroxides, carbon black, graphite, carbon nanotubes, graphene, sawdust or fibres of natural products, such as e.g. cellulose, synthetic fibres or metal fibres. Further suitable filling materials are hydrotalcites or zeolites or layer silicates, such as e.g. montmorillonite, bentonite, beidelite, mica, hectorite, saponite, vermiculite, ledikite, magadiite, illite, kaolinite, wollastonite, attapulgite.

Suitable chain lengtheners for the linear molecular weight build-up of polycondensation polymers, such as polyesters or polyamides, are for example diepoxides, bis-oxazolines, bis-oxazolones, bis-oxazines, diisocyanates, dianhydrides, bis-acyllactams, bis-maleimides, dicyanates carbodiimides. Further suitable chain lengtheners are polymeric compounds, such as e.g. polystyrene-polyacrylate-polyglycidyl (meth)acrylate copolymers, polystyrene-maleic anhydride copolymers and polyethylene-maleic anhydride copolymers.

Suitable pigments can be of an inorganic or organic nature. Suitable inorganic pigments are for example titanium dioxide, zinc oxide, zinc sulphide, iron oxide, ultramarine, carbon black. Suitable organic pigments are for example anthraquinones, anthanthrones, benzimidazolones, quinacridones, diketopyrrolopyrroles, dioxazines, indanthrones, isoindolinones, azo compounds, perylenes, phthalocyanines or pyranthrones. Further suitable pigments are effect pigments based on metal or pearlescent pigments based on metal oxides.

Optical brighteners are for example bisbenzoxazoles, phenylcumarins or bis(styryl)biphenyls and in particular optical brighteners of the formulae:

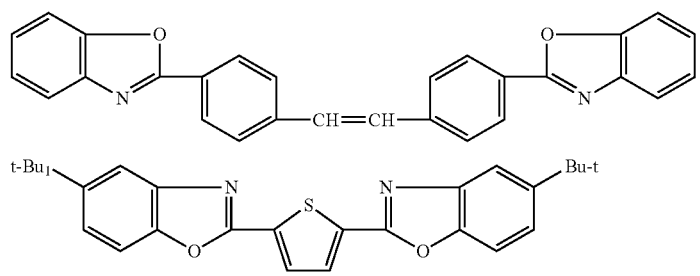

Suitable filling material deactivators are for example epoxides, such as e.g. bis-phenyl-A-diglycidyl ether, polysiloxanes, polyacrylates, in particular block copolymers, such as polymethacrylic acid-polyalkylene oxide or polystyrene-polyacrylate-polyglycidyle(meth)acrylate copolymers.

Suitable antistatic agents are for example ethoxylated alkylamines, fatty acid esters, alkyl sulphonates and polymers, such as e.g. polyetheramides or copolymers which comprise salts of acrylic acid, such as e.g. polyethylene-polyacrylate-Na copolymers.

Furthermore, the present invention relates to a moulding compound, a moulded part, a paint or a coating, producible from a previously described flame-retardant plastic material composition, in particular in the form of injection moulded parts, foils or films, coatings or paints, foams, fibres, cables and pipes, profiles, strips, membranes, such as e.g. geomembranes, adhesives, which are produced via extrusion, injection moulding, blow-moulding, calendering, pressing processes, spinning processes or brushing- and coating processes, e.g. for the electrical and electronics industry, construction industry, transport industry (car, aircraft, ship, train), for medical applications, for household- and electrical appliances, vehicle parts, consumer articles, furniture, textiles. A further field of use is varnishes, paints and coatings.

For example, the compositions according to the invention can be used for marine applications (pontoons, planks, boats), automobile applications (bumpers, batteries, covering parts, petrol tanks, cables, piping, etc.), aircraft parts, railway parts, bicycle- and motorcycle parts, space travel applications, such as e.g. satellite parts, housing parts for electrical appliances, such as computers, telephones, printers, audio- and video systems, plugs, printed circuits, switches, lampshades, refrigerators, coffee machines, vacuum cleaners, rotor blades for energy production, ventilators, foils for roof constructions, building foils, pipes, such as e.g. waste water pipes and gas pipes, connection parts, drainage systems, profiles, such as e.g. window profiles or cable ducts, wood composites, furniture, flooring, covering plates, synthetic lawns, stadium seats, carpets, nets, ropes, furniture parts, mats, garden seats, bottle boxes, containers and barrels.

The invention likewise relates to a method for the production of a previously described plastic material composition according to the invention, in which the at least one compound according to formulae I to IV is incorporated, before, after or simultaneously with the at least one further flame retardant, in the at least one plastic material, preferably the at least one thermoplastic polymer.

Incorporation of the above-described flame retardants and the additional additives in the plastic material is effected by normal processing methods, the polymer being melted and mixed with the flame retardants and additives, preferably by mixers, kneaders and extruders. There are preferred as processing machines, extruders, such as e.g. single-screw extruders, twin-screw extruders, planetary rolling extruders, ring extruders, co-kneaders, which are preferably equipped with vacuum degassing. The processing can thereby be effected under air or possibly under inert gas conditions. Different flame retardants and additives can thereby be added separately or as a mixture, in the form of liquids, powders, granulates or compacted products or likewise in the form of master batches or concentrates which comprise for example 50-80% of the compositions according to the invention.

The present invention is described with reference to the subsequent examples without restricting the invention to the special examples.

EMBODIMENTS a) Production of the Salts

Example 1: Synthesis of the potassium salt of 1-hydroxybenzotriazole (K-btaO)

Analogously to the literature (L. A. Carpino et al., Applied Chemistry Int. Ed. 2002, 41, 442-445), there is added, to a dispersion of $K_2CO_3$ (29.5 g) in a 16% aqueous methanol solution (171 ml), 1-hydroxybenzotriazole (36 g) with agitation. After conclusion of the gas evolution, the mixture is agitated for a further hour and subsequently the excess $K_2CO_3$ is filtered off. The solution is concentrated on the rotational evaporator and the obtained product is recrystallised by dissolving twice in methanol and precipitation in diethyl ether.

TGA: 1.6% weight loss at 40-380° C.; 73.4% weight loss at 380-390° C.; 0.2% weight loss at 390-600° C.

Example 2: Synthesis of the zinc salt of 1-hydroxybenzotriazole (Zn-btaO)

Analogously to the literature (A. D. Katsenis et al., Inorganic Chemistry Communication 2009, 12, 92-96), the desired product is obtained from the reaction of $Zn(ClO_4)_2$ (9.5 g) in an aqueous solution (375 ml) with two equivalents of K-btaO (8.5 g) in DMF (500 ml) after storage at room temperature as a solid.

TGA: 3.3% weight loss at 40-360° C.; 92.2% weight loss at 360-370° C.; 0.3% weight loss at 370-600° C.

b) Production and Testing of a Flame-Retardant Plastic Material Mixture According to the Invention The extrusions of the polypropylene samples (DOW C766-03) are effected at a temperature of 190° C. and a screw speed of rotation of 150 rpm on an 11 mm twin-screw extruder (process 11 by Thermo Scientific). The desired ratio of polymer and additives is firstly homogenised by mixing and supplied to extrusion via volumetric metering.

Test pieces for the fire test are produced from the granulate at a temperature of 220° C. and a pressure of 2 t using a hydraulic 10 t press (Werner 86 Pfleiderer). For this purpose, the granulate is filled into the compression mould and this is transferred into the already preheated press. At a pressure of 0.5 t, the granulate is firstly melted for 60 s. After conclusion of the melting time, the pressure is increased to 2 t and kept constant for a further 3 min. Whilst maintaining the compression pressure, the mould is cooled to 60° C. and thereafter the test pieces are removed. The test pieces have the following dimensions: 127.5×12.5×1.5 mm according to the standard.

The examples according to the invention and comparative examples contained in table 1 were tested according to DIN EN 60695-11-10 and the burning times and classification according to the standard were obtained:

TABLE 1

Compositions in polypropylene and results of the fire test

| Example | Composition Flame retardant | Burning times Sum of the subsequent burning times of 5 test pieces with two burnings (in seconds) | Classification according to DIN EN 60695-11-10 |
|---|---|---|---|
| Comparative example 1 (state of the art) | 15% diethylphosphinate aluminium | >200 | Not classified |
| Comparative example 2 | 20% diethylphosphinate aluminium | 170 | Not classified |
| Example 1 according to the invention | 15% diethylphosphinate aluminium + 2% Zn salt | 33.8 | V-2 |
| Example 2 according to the invention | 15% diethylphosphinate aluminium + 2% K salt | 2.0 | V-2 |
| Example 3 according to the invention | 8% diethylphosphinate aluminium + 2% K salt | 26.8 | V-2 |
| Example 4 according to the invention | 8% diethylphosphinate aluminium + 2% Zn salt | 53.5 | V-2 |
| Example 5 according to the invention | 8% phosphonate + 2% K salt | 8.7 | V-2 |

Diethylphosphinate aluminium (Exolit OP 1230, manufacturer: Clariant SE):

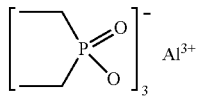

Phosphonate (Aflammit PCO 900, manufacturer: Thor GmbH) corresponding to the following structure:

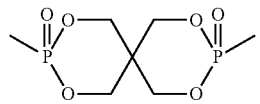

The examples according to the invention are self-extinguishing after removing the ignition source and have, surprisingly, reduced burning times relative to the comparative example, a classification according to V-2 is awarded.

New flame retardants and new flame-retardant compositions are proposed, which, because of the thermal stability and salt structure thereof, allow expectation of advantages relative to current products, such as e.g. low migration behaviour, reliable incorporation, long term stability.

The invention claimed is:

1. A method of imparting flame retardancy to a plastic material comprising combining the plastic material with a flame retardant compound, wherein the plastic material is selected from the group consisting of thermoplastic, elastomeric, and duroplastic plastic materials; and
    wherein the flame retardant compound is according to the general formulae I to IV

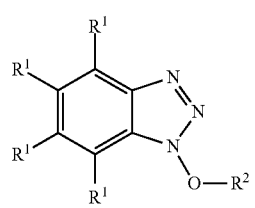

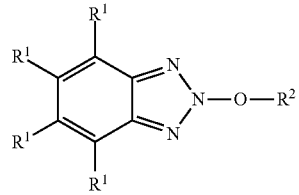

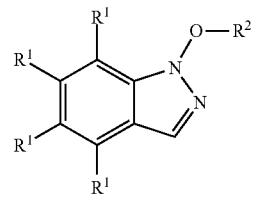

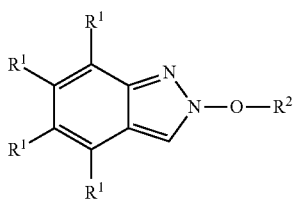

or a mixture of at least two compounds of the general formulae I to IV,
wherein, with each occurrence, respectively independently of each other,
$R^1$ is selected from the group consisting of hydrogen, alkyl radicals with 1 to 18 carbon atoms, partially or perfluorinated alkyl radicals with 1 to 18 carbon atoms, unsaturated organic radicals with up to 1 to 18 carbon atoms, two vicinal radicals $R^1$ also being able to be joined to form a ring, $-NO_2$, $-F$, $-Cl$ and $-Br$, and
$R^2$ is selected from the group consisting of mono-, bi- or trivalent inorganic or organic cations.

2. The method according to claim 1, wherein the plastic material is selected from the group consisting of:
   a) polymers made of olefins or diolefins, and copolymers in the form of statistical or block structures, terpolymers, and graft polymers, b) a polymer selected from polystyrene, polymethylstyrene, polyvinylnaphthalene, styrene-butadiene (SB), styrene-butadiene-styrene (SBS), styrene-ethylene-butylene-styrene (SEBS), styrene-ethylene-propylene-styrene, styrene-isoprene, styrene-isoprene-styrene (SIS), styrene-butadiene-acrylonitrile (ABS), styrene-acrylonitrile-acrylate (ASA), styrene-ethylene, styrene-maleic anhydride polymers including corresponding graft copolymers, and graft copolymers made of methylmethacrylate,
c) halogen-comprising polymers,
d) polymers made of unsaturated esters,
e) polymers made of unsaturated alcohols and derivatives,
f) polyacetals,
g) polyphenylene oxides and blends with polystyrene or polyamides,
h) polymers of cyclic ethers,
i) polyurethanes and polyureas,
j) polyamides,
k) polyimides, polyamideimides, polyetherimides, polyesterimides, polyetherketones, polysulphones, polyethersulphones, polyarylsulphones, polyphenylene sulphide, polybenzimidazoles, and polyhydantoins,
l) polyesters made of aliphatic or aromatic dicarboxylic acids and diols or made of hydroxycarboxylic acids,
m) polycarbonates, polyester carbonates, and blends thereof,
n) cellulose derivatives,
o) non-thermoplastic or duroplastic plastic materials,
p) epoxy resins,
q) phenol resins, urea-formaldehyde resins, and melamine-formaldehyde resins,
r) unsaturated polyester resins made of unsaturated dicarboxylic acids and diols,
s) silicones,
t) polyurethanes which are reaction products from di- or polyfunctional isocyanates and polyols, and polyureas,
u) alkyd resins and allyl resins, and
v) mixtures, combinations or blends of two or more of the previously mentioned polymers.

3. The method according to claim 1, wherein the compound according to the general formulae I to IV and/or the mixture of at least two compounds of formula I to IV is mixed with the plastic material, the total content of the compound according to the general formulae I to IV in the resulting mixture being 0.01 to 50% by weight.

4. The method according to claim 1, wherein the mono-, di- or trivalent inorganic cations are selected from the group consisting of $Li^+$, $Na^+$, $K^+$, ½ $Mg^{2+}$, ½ $Ca^{2+}$, ⅓ $Al^{3+}$, ½ $Zn^{2+}$ and/or the organic cations are selected from the group consisting of nitrogen- and phosphorus-containing organic cations.

5. The method according to claim 1, wherein, with each occurrence, $R^1$ is hydrogen and/or $R^2$ is a mono- or bivalent inorganic cation.

6. The method according to claim 1, further comprising combining the plastic material and the flame retardant compound with at least one further flame retardant selected from the group consisting of phosphorus-containing, nitrogen-containing, inorganic, silicon-containing, boron-containing, sulphur-containing, halogen-containing, and radical-forming flame retardants, wherein the at least one further flame retardant is combined in an amount of up to 70 parts by weight relative to the totality of the at least one compound according to the general formulae I to IV and of the at least one plastic material.

7. The method according to claim 6, wherein the at least one further flame retardant is selected from the group consisting of
a) inorganic flame retardants, layer silicates, organically- or unmodified double salts, POSS-(polyhedral oligomeric silsesquioxane) compounds, huntite, hydromagnesite, and halloysite,
b) nitrogen-containing flame retardants,
c) phosphorus-containing flame retardants,
d) halogen-containing flame retardants based on chlorine and bromine, optionally in combination with $Sb_2O_3$ and/or $Sb_2O_5$,
e) borates, optionally on carrier materials,
f) sulphur-containing flame-retardants,
g) anti-drip agents,
h) silicon-containing compounds,
i) radical-forming flame-retardants, and
j) carbon modifications.

8. The method according to claim 1, comprising combining the at least one plastic material and the at least one flame retardant with at least one stabilizer selected from the group consisting of phenolic antioxidants, phosphites, phosphonites, aminic antioxidants, sulphur-containing antioxidants, hydroxylamines, and hindered amines, in an amount of 0.01 to 10% parts by weight, relative to the totality of the at least one compound according to the general formulae I to IV and of the at least one plastic material.

* * * * *